US008401560B2

(12) United States Patent
Potkonjak

(10) Patent No.: US 8,401,560 B2
(45) Date of Patent: Mar. 19, 2013

(54) INFRASTRUCTURE FOR LOCATION DISCOVERY

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 243 days.

(21) Appl. No.: 12/479,565

(22) Filed: Jun. 5, 2009

(65) Prior Publication Data

US 2010/0246485 A1  Sep. 30, 2010

Related U.S. Application Data

(63) Continuation-in-part of application No. 12/415,518, filed on Mar. 31, 2009, which is a continuation-in-part of application No. 12/415,523, filed on Mar. 31, 2009.

(51) Int. Cl.
H04W 40/00 (2009.01)

(52) U.S. Cl. ............... 455/446; 455/449; 455/456.1; 455/404.2; 342/385; 342/450; 342/458; 342/463

(58) Field of Classification Search ............... 455/456.1, 455/41.2; 370/241–254, 310–328, 338–341; 709/220–223, 229–244
See application file for complete search history.

(56) References Cited

U.S. PATENT DOCUMENTS

| | | | |
|---|---|---|---|
| 6,363,334 B1 * | 3/2002 | Andrews et al. | 703/13 |
| 6,744,740 B2 | 6/2004 | Chen | |
| 7,289,466 B2 | 10/2007 | Kore et al. | |
| 7,295,556 B2 | 11/2007 | Roese et al. | |
| 7,457,860 B2 * | 11/2008 | Shang et al. | 709/223 |
| 7,786,885 B2 | 8/2010 | Payton | |
| 7,812,718 B1 | 10/2010 | Chan et al. | |
| 7,855,684 B2 * | 12/2010 | Ryu et al. | 342/464 |
| 7,970,574 B2 * | 6/2011 | Jin | 702/150 |
| 8,054,226 B2 | 11/2011 | Sahinoglu et al. | |
| 2002/0045455 A1 | 4/2002 | Spratt | |
| 2002/0187770 A1 * | 12/2002 | Grover et al. | 455/403 |
| 2003/0117966 A1 * | 6/2003 | Chen | 370/255 |
| 2004/0147223 A1 * | 7/2004 | Cho | 455/41.2 |
| 2005/0030904 A1 | 2/2005 | Oom Temudo de Castro et al. | |
| 2005/0261004 A1 * | 11/2005 | Dietrich et al. | 455/456.2 |
| 2006/0039300 A1 * | 2/2006 | Ogier et al. | 370/254 |
| 2006/0046664 A1 * | 3/2006 | Paradiso et al. | 455/96 |
| 2006/0077918 A1 * | 4/2006 | Mao et al. | 370/310 |
| 2006/0281470 A1 * | 12/2006 | Shi et al. | 455/456.2 |
| 2007/0042706 A1 * | 2/2007 | Ledeczi et al. | 455/3.01 |
| 2007/0207750 A1 * | 9/2007 | Brown et al. | 455/127.5 |
| 2008/0080441 A1 | 4/2008 | Park et al. | |
| 2008/0232281 A1 * | 9/2008 | Pahlavan et al. | 370/310 |
| 2008/0309556 A1 * | 12/2008 | Hohl | 342/451 |

(Continued)

OTHER PUBLICATIONS

Koushanfar, F., "Iterative Error-Tolerant Location Discovery in Ad-hoc Wireless Sensor Networks," Master of Science in Electrical Engineering Thesis, 2001, 101 pages, University of California Los Angeles.

(Continued)

Primary Examiner — Jinsong Hu
Assistant Examiner — Magdi Elhag
(74) Attorney, Agent, or Firm — Brundidge & Stanger, P.C.

(57) ABSTRACT

Techniques are generally described for determining locations of a plurality of communication devices in a network. In some examples, methods for creating a location discovery infrastructure (LDI) for estimating locations of one or more of a plurality of communication nodes may comprise one or more of determining a plurality of locations in the terrain to place a corresponding plurality of beacon nodes, determining a plurality of beacon node groups for the placed beacon nodes, and determining a schedule for the placed beacon nodes to be active. Additional variants and embodiments are also disclosed.

11 Claims, 11 Drawing Sheets

U.S. PATENT DOCUMENTS

| | | | |
|---|---|---|---|
| 2009/0069020 A1* | 3/2009 | Wang et al. | 455/446 |
| 2010/0148977 A1 | 6/2010 | Tseng et al. | |
| 2010/0150070 A1 | 6/2010 | Park et al. | |
| 2010/0246438 A1 | 9/2010 | Potkonjak | |

OTHER PUBLICATIONS

Savarese et al., "Robust Positioning Algorithms for Distributed Ad-Hoc Wireless Sensor Networks," USENIX 2002 Annual Technical Conference, Jun. 2002, pp. 317-327.

Office Action, issued in U.S. Appl. No. 12/415,523, mailed Jan. 11, 2011, 9 pages.

Notice of Allowance, issued in U.S. Appl. No. 12/415,523, mailed Aug. 12, 2011, 8 pages.

Savvides, A. et al., "Dynamic Fine-Grained Localization in Ad-Hoc Networks of Sensors," Proceedings of the 7th Annual International Conference on Mobile Computing and Networking, Jul. 2001, pp. 166-179.

Ali, A. M. et al., "An Empirical Study of Collaborative Acoustic Source Localization," Proceedings of the 6th International Conference on Information Processing in Sensor Networks, Apr. 2007, pp. 41-50.

Feng, J. et al. "Consistency-Based On-line Localization in Sensor Networks," Second IEEE International Conference on Distributed Computing in Sensor Systems, Jun. 2006, pp. 529-545.

Office Action, issued in U.S. Appl. No. 12/415,518, mailed Dec. 6, 2011, 15 pages.

C. Peng et al.,"BeepBeep: A High Accuracy Acoustic Ranging System using COTS Mobile Devices", Sensys 2007, p. 1-14.

L. Girod et al., "The Design and Implementation of a Self-Calibrating Distributed Acoustic Sensing Platform", In Sensys 2006, pp. 71-84.

J. Ash et al., "Robust System Multiangulation Using Subspace Methods", In IPSN 2007, pp. 61-68.

B. Kusy et al., "Radio interferometric tracking of mobile wireless nodes", MobiSys 2007, pp. 139-151.

K. Whitehouse et al., "The Effects of Ranging Noise on Multi-hop Localization: An Empirical Study", IPSN 2005.

M. Li et al., "Rendered Path: Range-Free Localization in Anisotropic Sensor Networks with Holes", MobiCom 2007, pp. 51-62.

M. Rudafshani et al., "Localization in Wireless Sensor Networks", IPSN 2007, pp. 51-60.

L. Girod, "Development and Characterization of an Acoustic Rangefinder", Technical Report USC-CS-00- 728, Apr. 2000.

L. Girod et al., "Robust Range Estimation using Acoustic and Multimodal Sensing", IEEE/RSJ International Conference on Intelligent Robots and Systems, 2001.

J. Feng, "Location Discovery in Sensor Networks", Technical Report UCLA, Apr. 2008 (uploaded as two separate PDF files due to size).

* cited by examiner

Computing Program Product 1601

Signal bearing medium 1603

1605
At least one of
 - one or more instructions for creating a LDI for estimating locations of one or more of a plurality of communication nodes in a terrain
 - one or more instructions for determining a plurality of locations in the terrain to place a corresponding plurality of beacon nodes, based at least in part on likely location discovery error for discovering locations of one or more of the plurality of communication nodes using the placed beacon nodes
 - one or more instructions for determining a plurality of beacon node groups for the placed beacon nodes, based at least in part on the placed beacon nodes within individual beacon node groups being able to be active simultaneously without causing interference or collision at individual communication nodes of the plurality of communication nodes
 - one or more instructions for determining a schedule for the placed beacon nodes to be active, based at least in part on a waiting time of individual communication nodes to receive location determination signals from one or more beacon nodes

| 1607<br>A computer readable medium | 1609<br>A recordable medium | 1611<br>A communications medium |
|---|---|---|

Fig. 16

INFRASTRUCTURE FOR LOCATION DISCOVERY

RELATED APPLICATIONS

This application is a continuation-in-part of co-pending application Ser. No. 12/415,518, filed on Mar. 31, 2009, entitled "Efficient Location Discovery," and co-pending application Ser. No. 12/415,523, filed on Mar. 31, 2009, entitled "Network Node Location Discovery," the entire specifications of which are hereby incorporated by reference in its entirety for all purposes, except for those sections, if any, that are inconsistent with this specification.

BACKGROUND

Wireless communication networks are becoming increasingly popular. A wireless network may include plurality of wireless devices. In some applications, the locations of some of the wireless devices may be known, while the location of one or more remaining wireless devices in the wireless network may need to be determined. Such determination may be useful for a variety of applications, such as navigation, tracking, and so forth. Improved determination techniques may facilitate the effectiveness of many sensing and communication procedures.

BRIEF DESCRIPTION OF THE DRAWINGS

Subject matter is particularly pointed out and distinctly claimed in the concluding portion of the specification. The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. Various embodiments will be described referencing the accompanying drawings in which like references denote similar elements, and in which:

FIG. 16 illustrates an example computing program product, all arranged in accordance with the present disclosure.

DETAILED DESCRIPTION OF ILLUSTRATIVE EMBODIMENTS

Figure 1:
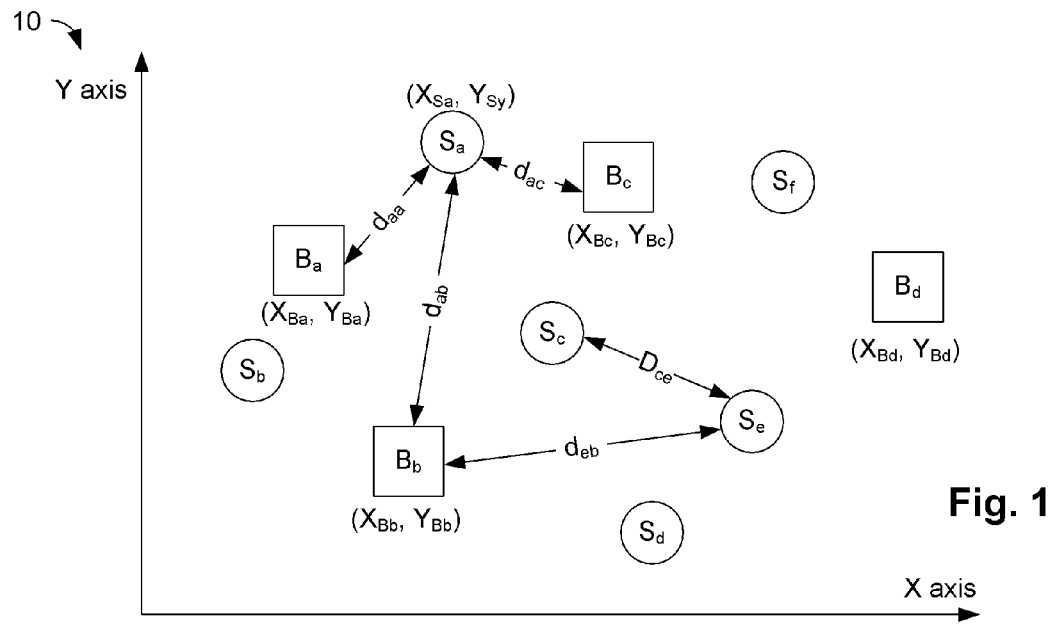
FIG. 1 illustrates an example wireless network.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to an infrastructure for location discovery of one or more communication nodes in a wireless network.

FIG. 1 illustrates an example wireless network 10, in accordance with various embodiments of the present disclosure. The network 10 may be any appropriate type of wireless network, including but not limited to a wireless ad hoc network, a mobile ad hoc network, a wireless mesh network, a wireless sensor network, or the like. The wireless network 10 may include a plurality of communication nodes Sa, . . . , Sf and a plurality of beacon nodes Ba, . . . , Bd. In various embodiments, individual communication nodes Sa, . . . , Sf and/or the beacon nodes Ba, . . . , Bd may be capable of communicating with other nodes and/or other wireless devices within network 10 using an appropriate wireless protocol, such as but is not limited to Institute of Electrical and Electronics Engineers (IEEE) 802.11 standards (e.g., 802.11g. released on June, 2003). In various embodiments, one or more communication nodes may comprise of one or more appropriate wireless communication devices.

As illustrated in FIG. 1, an X-axis and a Y-axis may be analytically superimposed on the network 10 to permit locating one or more nodes with respect to the two axes. The number and location of the nodes illustrated in FIG. 1 may be purely an example. In various other embodiments, the disclosure may be practiced with more or less nodes of either type or types, or different locations of the nodes. For example, although the nodes may be illustrated to be located in the first quadrant of the coordinate system of FIG. 1 (e.g., positive x and y coordinates), in various embodiments, one or more beacon nodes and/or communication nodes may also be located in other quadrants as well.

In various embodiments, locations of one or more beacon nodes Ba, . . . , Bd may be known relative to the two analytical axes (hereinafter, simply axes). For example, the location coordinates of the beacon node Ba (e.g., $(X_{Ba}, Y_{Ba})$) with reference to the X-axis and the Y-axis may be known to the beacon node Ba. Similarly, the coordinates of the beacon nodes Bb, . . . , Bd (e.g., $(X_{Bb}, Y_{Bb}), \ldots, (X_{Bd}, Y_{Bd})$) may also be known to the respective beacon nodes. In various embodiments, one or more beacon nodes may be equipped with a global positioning system (GPS) or any other appropriate location identification system through which the beacon nodes may identify their respective locations. In other embodiments, some or all the beacon node locations may be predetermined. In various embodiments, the location information may be shared with one or more peer or server devices.

In various applications, it may not be feasible to predetermine or equip all the nodes in the network with GPS or other location identification system due to, for example, high cost, low battery life, larger size, weight, etc. of such a system. Accordingly, in various embodiments, location of one or more communication nodes Sa, . . . , Sf may not be preknown, and/or one or more communication nodes may not be equipped with, for example, a GPS system. For example, the location coordinates of the communication node Sa (e.g., $(X_{Sa}, Y_{Sa})$) relative to the X-axis and the Y-axis may be unknown to the node Sa and/or to other nodes in the network 10. Thus, in various embodiments, the location(s) of one or more communication nodes in network 10 may be needed to be determined.

In various embodiments, there may be different types of communication between two nodes of the network 10. For example, a node may be arranged to transmit acoustic signals that may include information related to such a node (e.g., location information of such a node, if known), and may also be arranged to receive acoustic signals transmitted by other nodes. In various embodiments, a node may also be arranged to transmit and receive radio signals including data and/or other information. In various embodiments, an acoustic signal range (ASR) of a node may be independent from a radio signal range (RSR) of the node. Furthermore, all nodes in the network may not have the same ASR and RSR properties.

In various embodiments, reception of appropriate signals by a first node from a second node may permit the first node to determine a distance between the first node and the second node. In various embodiments, determination of distance between two nodes may be performed using techniques known to those skilled in the art.

For example, a node may be configured to receive acoustic signals from one or more neighboring nodes, and may also be configured to determine distances between such a node and the one or more neighboring nodes in response to the received acoustic signals. In various embodiments, a node may be configured to receive acoustic signals from one or more nodes that are within an ASR of the node, wherein the acoustic signals may include location information about the respective one or more nodes. In various embodiments, other types of signals (e.g., radio signals) may also include location information about a node, and it may be possible to determine a distance between two nodes based at least in part on one of the nodes receiving a radio signal from another node.

For example, communication node Sa may receive signals from neighboring beacon nodes Ba, Bb, and Bc, and may be able to determine distances $d_{aa}$, $d_{ab}$, and $d_{ac}$ between the communication node Sa and beacon nodes Ba, Bb, and Bc, respectively. In various embodiments, communication node Sa may be arranged to receive signal transmissions from beacon node Bd when node Sa is within a signal range of node Bd, and in that case, node Sa may be arranged to determine a distance $d_{ad}$ (not illustrated in FIG. 1) between node Sa and beacon node Bd. Similarly, other communication nodes Sb, . . . , Sf may also be arranged to determine distances between the respective communication node and one or more neighboring beacon nodes. In various embodiments, a first communication node may also be configured to determine a distance between the first communication node and a second communication node. For example, communication node Sc may be configured to estimate a distance $D_{ce}$ between communication nodes Sc and Se.

Transmission of a signal by a node (e.g., a first node) may imply that another node (e.g., second node) may be arranged to receive the signal and determine its distance from the node (e.g., the first node) in response to the received signal.

In various embodiments the phrase "network" may indicate a wireless communication network (such as network 10 of FIG. 1) that may include a plurality of communication nodes (one or more of whose locations may need to be determined) and a plurality of beacon nodes (one or more of whose locations may be known or already determined). In various embodiments, the number and/or configuration of communication and/or beacon nodes in such a "network" may not be restricted by the number and/or configuration of communication and/or beacon nodes in the network 10 of FIG. 1.

In various embodiments, neighboring nodes of a selected node may include at least those other nodes from which the selected node may receive signal transmission that may permit the selected node (or vicariously via a peer/server device) to determine the distance from the selected node to those other nodes. Thus, a selected node may calculate a distance to other nodes that are determined to be neighboring nodes of the selected node, based on signal transmissions received by the selected node from the other nodes. For example, in the network 10 of FIG. 1, communication node Sb may be arranged to receive transmitted signals from nodes Ba, Bb, Sa, and Sc, determine the distances to these nodes, and designate these nodes as neighboring nodes of node Sb. Similarly, when Sb is unable to determine its distance from node Bd (as Sb may not receive signal from Bd because of, for example, a large distance between the two nodes), then Bd may not be designated as a neighboring node of node Sb.

Although the nodes in FIG. 1 are illustrated to be in a two dimensional plane (e.g., x-y plane), in various embodiments, the inventive principles discussed in this disclosure may be extended to a three dimensional space as well (by adding a third vertical dimension or z-axis). Although a Cartesian coordinate system (e.g., with X-Y axis) has been used in FIG. 1, any other appropriate coordinate systems (e.g., a polar coordinate system, a cylindrical coordinate system, a circular coordinate system, or the like) may also be used.

In various embodiments, it may be possible to determine the location of a selected communication node based on determining the distance between the selected communication node and at least three non-collinear neighboring beacon nodes, if the determination of location is done in a two dimensional plane, as will be discussed in more details. If the determination of location is done in a three dimensional plane, distance between the selected communication node and at least four non-collinear neighboring beacon nodes may be used. Without losing any generality and mainly for the purpose of simplicity, the location determination problem discussed henceforth in this disclosure may be considered in a two dimensional plane, unless otherwise stated. As will be readily understood by those skilled in the art based on the teachings provided in this disclosure, the inventive principles of various embodiments of this disclosure may be easily applied for a higher (e.g., three) dimensional location determination.

Accordingly, to effectively determine the locations of one or more communication nodes, individual communication nodes may have at least three non-collinear neighboring beacon nodes. In various embodiments, estimation of distance between two nodes and subsequent estimation of location of a communication node may be related to the environment (e.g., the terrain) in which the nodes may be deployed. For example, some or all the nodes may be deployed in an indoor terrain and/or an outdoor terrain, with one or more obstacles (e.g., trees, buildings, walls, etc.) in the terrain that may hinder communication between two nodes. Accordingly, given a terrain with one or more obstacles, a plurality of beacon nodes may be placed in the terrain. Individual communication nodes may be arranged to communicate with at least three non-collinear neighboring beacon nodes (from the plurality of beacon nodes placed in the terrain) to determine the location of the individual communication nodes.

Although individual nodes in the network 10 may have been identified either as a communication node or a beacon node, in various embodiments, the difference between the two types of nodes, for the purpose of this disclosure, may be the location knowledge that may be available to the beacon nodes, as will be discussed in more details herein later. In various embodiments, the beacon nodes may also act as a communication node, and vice versa, and the labeling of a node as a communication node and/or a beacon node is not intended to limit other functionalities of the node. In various embodiments, a communication node may also act as a beacon node. For example, once the location of a communication node Sa is determined using one of the various methods described in more details later in this disclosure, the node Sa may subsequently act as a beacon node while facilitating determination of the locations of other communication nodes (e.g., nodes Sb, Sc, etc.). In various embodiments, a beacon node may also act as a communication node in case the beacon node loses its location determination capability due to, for example, loss of its GPS capabilities, suspicious readings on the GPS system, etc. For the purpose of this disclosure and unless otherwise stated, the phrase node (without specific mention of its type) may refer to a communication node and/or a beacon node.

Overview of Infrastructure for Location Discovery (LDI)

Figure 2:
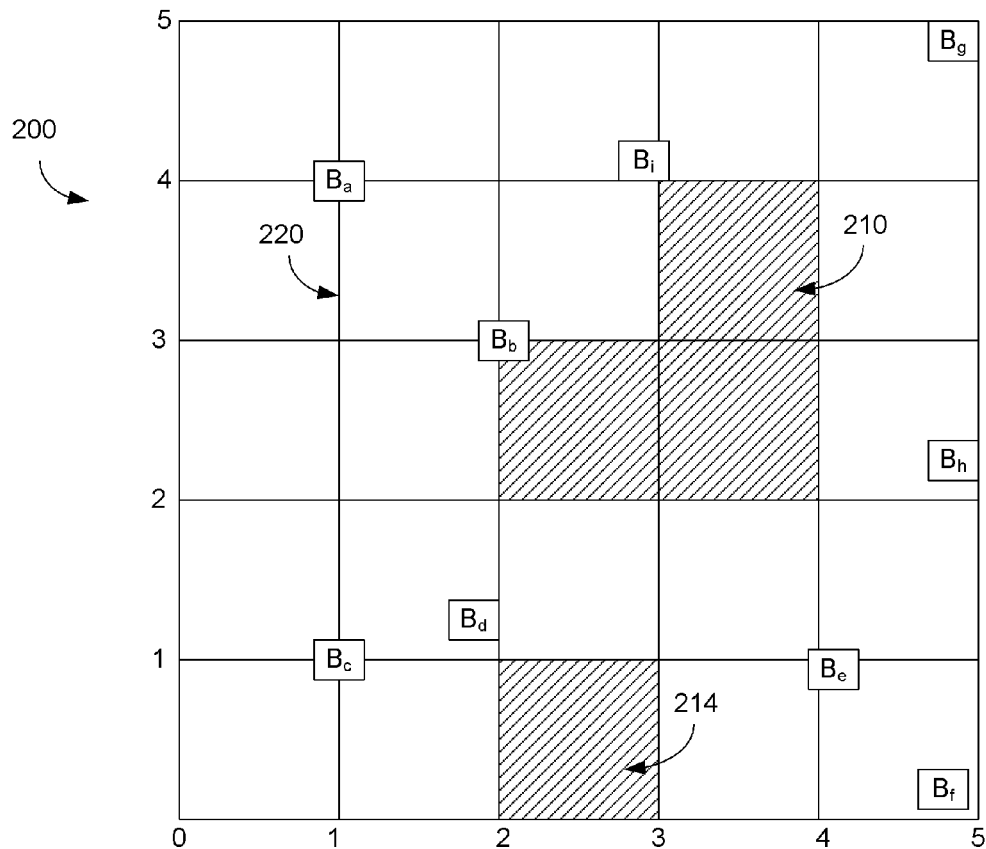
FIG. 2 illustrates an example terrain that includes one or more obstacles.

FIG. 2 illustrates an example terrain 200 that includes one or more obstacles, in accordance with various embodiments of the present disclosure. The shaded regions in FIG. 2 may illustrate example obstacles (e.g., obstacles 210, 214, etc.), which may be of any type (e.g., houses, buildings, trees, walls, etc.), and which may block all or part of acoustic signals used for estimation of locations of communication nodes. The shape and size of the terrain 200 and the obstacles 210 and 214 is merely an example, and other shapes and sizes of terrain and obstacles may also be possible. In various embodiments, the terrain 200 may be 500 meters (m) by 500 m, with known topology (e.g., known shape and size of the obstacles), and may be divided in a 5×5 grid 220, as illustrated by the solid lines.

In various embodiments, a minimal number of beacon nodes may be placed in the terrain 200 such that location of an arbitrary placed communication node in the terrain 200 may be determined. The placed beacon nodes may be a part of an infrastructure for location discovery (LDI) of one or more communication nodes in the terrain. In various embodiments, the terrain 200 may include a plurality of beacon nodes Ba, Bb, ..., Bi, the placement of which will be discussed in more details later.

Figure 3:
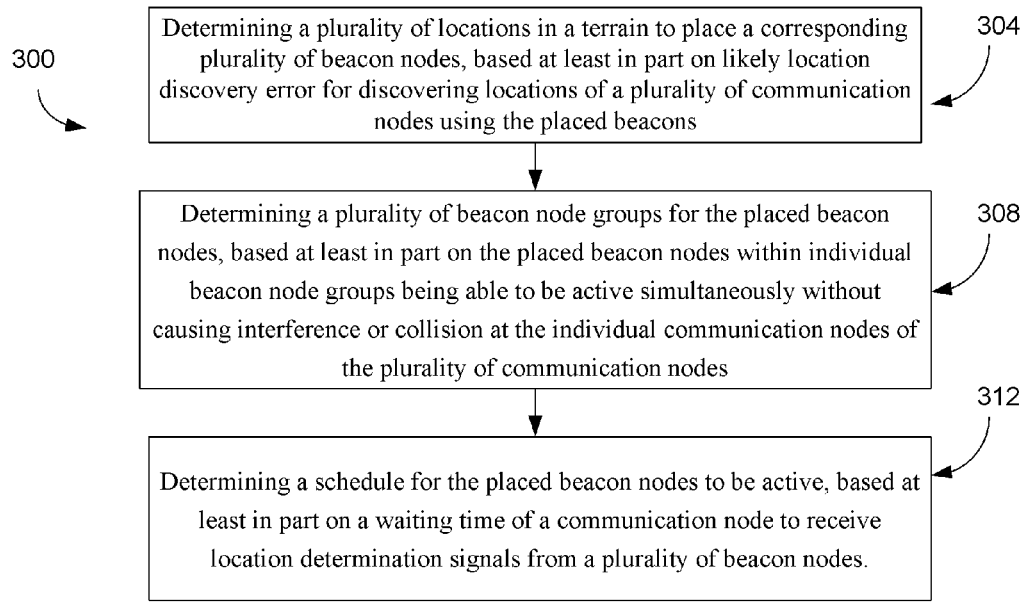
FIG. 3 illustrates an example method for creating and operating an infrastructure for determining locations of one or more communication nodes.

FIG. 3 illustrates an example method 300 for creating and operating an infrastructure for determining locations of one or more communication nodes in the terrain, in accordance with various embodiments of the present disclosure. Various ones of these embodiments may be instantiated on a computing device, that is, practicing the method on a computing device provided with the decision logic to be described. The method 300 may include, at block 304, determining a plurality of locations in a terrain (e.g., terrain 200 of FIG. 2) to place a corresponding plurality of beacon nodes, based at least in part on likelihood of location discovery error for discovering locations of a plurality of communication nodes using the placed beacon nodes. For example, the beacon nodes may be placed such that a communication node located in any part of the terrain may have three or more neighboring beacon nodes. The beacon nodes may also be placed in such a way that the location determination errors may be reduced for a set of stationary or mobile communication nodes. An example placement of nine beacon nodes (Ba, ..., Bi) is illustrated in FIG. 2, where a communication node located in any part of the terrain can communicate, without any obstruction, with three or more neighboring beacon nodes, under the assumption that the communication range of the communication and/or beacon nodes is at least 2.5 m. In various embodiments, a minimum number of beacon nodes and their corresponding locations for placement in the terrain may also be determined, such that a communication node located anywhere in the terrain may receive signals from three or more neighboring beacon nodes. The placement of the beacon nodes will be discussed in more details herein later.

Referring again to FIG. 3, the method 300 may further include, at block 308, determining a plurality of beacon node groups for the placed beacon nodes, based at least in part on the placed beacon nodes within individual beacon node groups being able to be active simultaneously without causing interference or collision at the individual communication nodes of the plurality of communication nodes. For example, at block 308, the nine placed beacon nodes in FIG. 2 may be divided in one or more beacon node groups, such that the individual beacon nodes in a beacon node group may simultaneously broadcast its acoustic signals simultaneously without causing collision at the receiving communication nodes. For example, beacon nodes Ba and Bf of FIG. 2 may simultaneously transmit signals without causing collision or interference at any location in the terrain 200. Similarly, beacon nodes Bc and Bg may also transmit simultaneously without causing collision or interference at any location in the terrain. In various embodiments, beacon nodes Ba and Bb, for example, may be proximally located, and there may be one or more communication nodes (not illustrated in FIG. 2) in the terrain that may receive signals from both the beacon nodes Ba and Bb. Simultaneous transmission from beacon nodes Ba and Bb may cause collision or interference at such communication nodes. Accordingly, beacon nodes Ba and Bb may not transmit simultaneously.

In various embodiments, a possible example grouping of beacon nodes may be {{Ba, Bf}, Bb, {Bc, Bg}, Bd, Be, Bh, Bi}. For this example, there is a total of seven groups: two groups having two beacon nodes each, and rest of the five groups having a single beacon node. Without the grouping, nine separate beacon nodes would transmit in their own respective time slots, thereby requiring a total of nine time slots. However, with the described example grouping, only seven time slots may be required for the nine beacon nodes, one slot for a respective beacon node group. Another example grouping may be {{Ba, Bf}, {Bb, Bh}, {Bc, Bg}, Bd, {Be, Bi}}, which corresponds to five time slots to transmit signals of the respective five beacon node groups. The grouping of the beacon nodes described herein is merely examples, and other groupings may also be contemplated.

As illustrated by block 312, the method 300 may further comprise determining by the computing device, a schedule for the placed beacon nodes to be active. The schedule may be based at least in part on a waiting time of individual communication nodes to receive location determination signals from one or more neighboring beacon nodes. For example, the schedule may assign time slots to individual beacon node groups determined earlier at block 308, for beacon nodes of a beacon node group to transmit signals in the assigned time slots. In various embodiments, the objective of the scheduling may be to permit communication nodes to estimate their respective distance measurements from neighboring beacon nodes as frequent as possible. The objective may also be to reduce a waiting time for individual communication nodes to receive signals from at least three unique neighboring beacon nodes. This may, for example, ensure that a communication node may receive signals from at least three neighboring beacon nodes at rapid succession and determine its location, and may help determine locations of a mobile communication node with relatively more accuracy. Also, a communication node may have to be active for a less amount of time to receive signals from the neighboring beacon nodes. In various embodiments, for the example beacon node grouping previously discussed, an example broadcast ordering may be {Ba, Bb, {Bc, Bg}, {Bh, Bi}, Bd, Be, Bf}, which may result in an average waiting time of three time slots for most communication nodes located any where in the terrain 200. The scheduling of the beacon nodes will be discussed in more details further below.

Location Discovery (LD) Problem

As previously discussed with reference to FIG. 1, the locations of one or more beacon nodes in a terrain may be known (e.g., once the beacon nodes are placed in the terrain in accordance with, for example, method 300 of FIG. 3), and the location of one or more communication nodes in the network may be estimated. In various embodiments, the location discovery problem may be formulated using non-linear programming and/or linear programming approach.

Non-linear Programming (NPL) Based Formulation

In various embodiments, the location discovery problem may be formulated as an instance of non-linear programming, where the unknown variables may be the locations of one or more communication nodes. For example, $S=\{S_i(X_{Si}, Y_{Si})\}$, $i=1, \ldots, S_N$, may be a set of $S_N$ communication nodes with unknown locations, and $B=\{B_j(X_{Bj}, Y_{Bj})\}$, $j=1, \ldots, N_B$ may be a set of $N_B$ beacon nodes with known locations, where $N_B \geq 3$.

As previously discussed, it may be possible to estimate the distance $d_{ij}$ between a communication node Si and its neighboring beacon node Bj. Error ($\epsilon_{ij}$) in the measured distance between communication node Si and the beacon node Bj may be expressed as a difference between the distance $d_{ij}$ and the estimated Euclidean distance, which may be given as:

$$\epsilon_{ij} = \sqrt{(X_{Bj}-X_{si})^2+(Y_{Bj}-Y_{si})^2} - d_{ij} \qquad \text{Equation 1.}$$

In various embodiments, an objective function may be to minimize or reduce a likelihood of location discovery errors or an appropriate function of the location discovery errors. In various embodiments, the likelihood of location discovery error may refer to an estimated, probable or likely value of the location discovery error. The term "minimize" and/or the like as used herein may include a global minimum, a local minimum, an approximate global minimum, and/or an approximate local minimum. Likewise, it should also be understood that, the term "maximize" and/or the like as used herein may include a global maximum, a local maximum, an approximate global maximum, and/or an approximate local maximum. One or more techniques for formulation and solution of a nonlinear objective function for estimating locations of one or more communication nodes may be well known to those skilled in the art, and may be outside the scope of this disclosure.

Linear Programming (LP) Based Formulation

Linearization of a system of non-linear equations by squaring and subtracting the equations from one another, and solving the linear equations by taking the minimum mean square estimate (MMSE) is a useful method of linearizing problem sets. Note that the system of linear equations may be solved optimally by singular value decomposition (SVD) under the assumption that the ranging error model follows the Gaussian distribution.

However, as discussed in more details herein later, in various embodiments, the ranging errors of real deployed communication nodes may not follow the Gaussian distribution. Instead, the ranging errors may have complex forms that cannot be captured by existing parametric distributions. Thus, the problem of location discovery may be formulated using nonlinear programming, and the formulation may be linearized and solved using linear programming (LP) and/or convex programming techniques.

During the linearization process, equation 1 may be simplified to obtain:

$$d_{ij}^2 + 2d_{ij}\epsilon_{ij} + \epsilon_{ij}^2 = X_{Bj}^2 - 2X_{Bj}X_{Si} + X_{Si}^2 + Y_{Bj}^2 - 2Y_{Bj}Y_{Si} + Y_{Si}^2 \quad \text{Equation 2.}$$

A number of such equations may be obtained (e.g., between the communication node Si and individual beacon nodes B1, B2, ..., BK), and the equations may be manipulated to obtain a linear programming based formulation of the location discovery problem, as is well known to those skilled in the art and is outside the scope of this disclosure.

Distance Measurement Error Model

In practice, due to a number of reasons (e.g., obstacles located between two nodes, noise present in measurements, a large network size, a large number of nodes deployed in the network, interference, technology used for distance measurement, etc.), distance determination between two nodes may include inaccuracies. In various embodiments, a distance measurement error model may be constructed to model the error probability related with distance determination between any two nodes.

Figure 4:
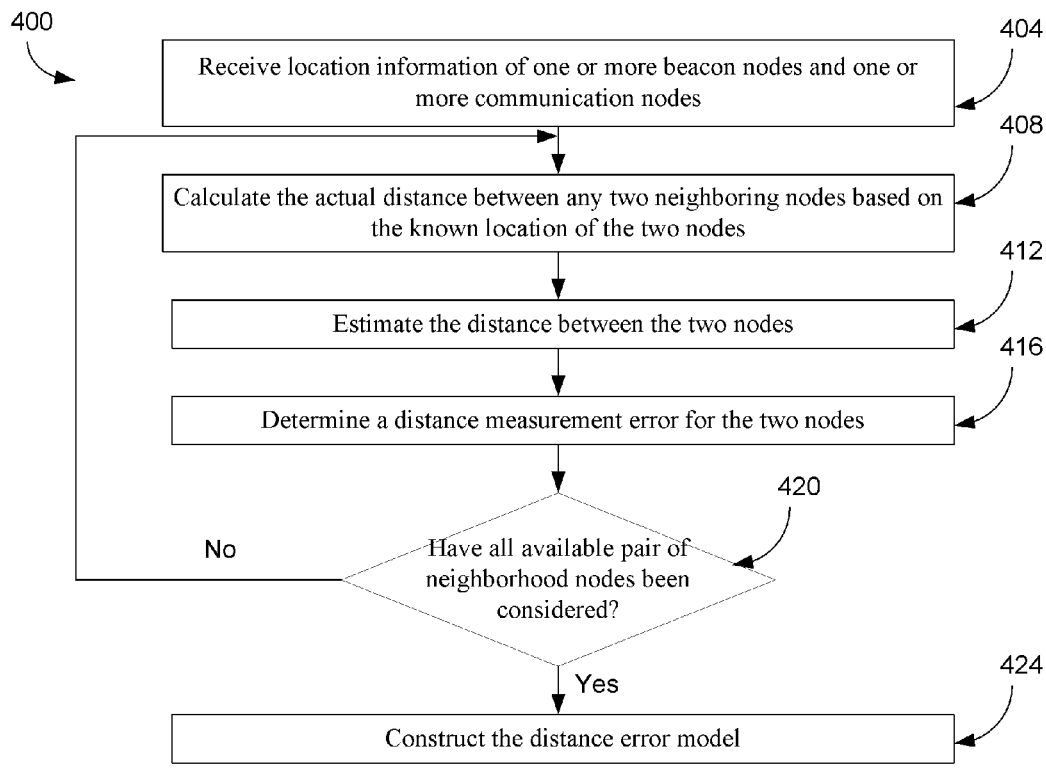
FIG. 4 illustrates an example method for constructing a distance error measurement model.

FIG. 4 illustrates an example method 400 for constructing a distance error measurement model, in accordance with various embodiments of the present disclosure. Similarly, various ones of these embodiments may be instantiated on a computing device, that is, practicing the method on a computing device provided with the decision logic to be described. The method 400 may be implemented in an experimental setup, where the locations of one or more communication nodes may be known in advance to a user or a system setting up the experiment. The example method 400 may include one or more functions or processing operations as illustrated by blocks 404, 408, 412, 416, 420, and/or 424.

At block 404, the location of one or more communication nodes in a network may be known (e.g., retrieved from a user or a system coordinating and/or controlling the experimental set up), in addition to the known location of one or more beacon nodes in the network. For example, the location of one or more communication nodes in a network may be known in advance for at least the purpose of constructing such a model in an experimental set up. In various embodiments, the location information of the nodes may be received by the respective nodes. Alternatively, in various embodiments, a centralized computing device (not illustrated in FIG. 1), a user, and/or an administrator of the network may receive the location information.

At block 408, from the known locations of any two neighboring nodes (e.g., a communication node and a beacon node), the actual distance between the two nodes may be calculated. At block 412, the distance between the two nodes may be estimated using one of many techniques, based at least in part on one of the nodes receiving signals from the other node. The actual and the estimated distances between the two nodes may be compared to determine, at block 416, a distance measurement error for the two nodes. In various embodiments, this distance measurement error may be an indication of accuracy of distance determination (or distance estimation, since some amount of inaccuracy may be involved) between the two nodes.

At block 420, the method 400 may determine if all of the available pairs of neighborhood nodes have been considered. The process 400 may continue from block 420 to block 408, where the process may repeat for other possible pairs of neighboring nodes. Otherwise, the process 400 may continue from block 420 to block 424, where a distance error model may be constructed based at least in part on the determined distance measurement error for possible pairs of neighboring nodes.

Figure 5:
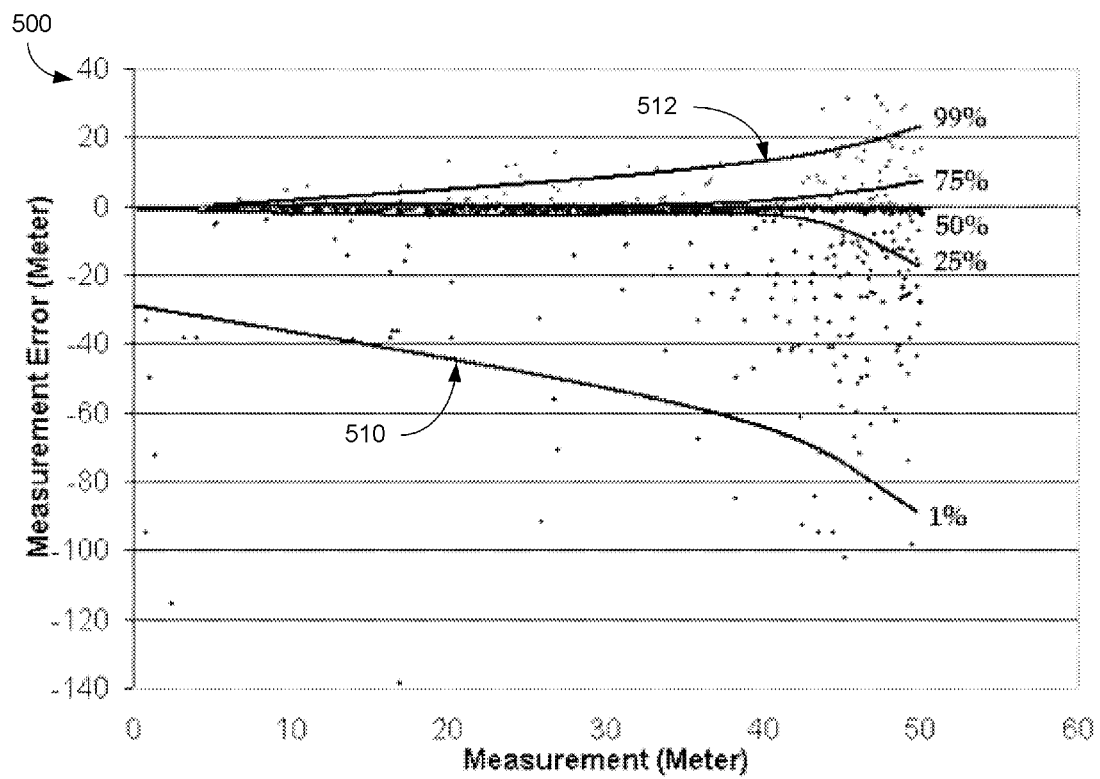
FIG. 5 illustrates an example distance measurement model.

FIG. 5 illustrates an example distance measurement model 500, in accordance with various embodiments of the present disclosure. The model 500 includes a graph plotting a plurality of estimated distances (e.g. meters) and the associated measurement errors (e.g. meters) for an example wireless network. The data in the figure may be from a wireless network similar to that in FIG. 1, but may employ a larger number of communication nodes and beacon nodes (e.g., the total number of communication nodes may be around 2000). These two sets of data may be the input to the distance measurement error model.

As observed from model 500, for the example network, for a larger measurement distance between any two nodes, the probability of error in the measurement may be greater. That is, as distance between two nodes grows larger, the distance measurement may be more prone to error, as indicated by larger number of scattered data points beyond, for example, at around 40 meter (m) along the x-axis. Also, nodes that may be further apart (e.g., more than at around 50 m apart) may be out of each other's signal range, and may not be able to exchange location and distance measurement information, resulting in substantially less number of measurements beyond the 50 m range.

In various embodiments, the solid curves (e.g., curves 510, 512, etc.) in FIG. 5 may correspond to a percentage of the points that may form the lowest C % of the cumulative density function (CDF). Five such example values of C are illustrated in FIG. 5. For example, the curve for C=75% may approximately have a form of $0.0004M^3 - 0.0233M^2 + 0.4478M - 2.4591$, where M may be the distance measurement in meters. The individual curves may describe the probability of any given measurement that may have certain error with C % confidence. For example, for a distance measurement of around 10 m, according to the curve C=75%, there may be approximately 75% probability that the measurement may have an error of around 0.088 m (e.g. 0.0004(10)3−0.0233 (10)2+0.4478(10)−2.4591). In another example, for a distance measurement of around 45 m, there may be a 75% probability that the measurement may have an error of around 6.959 m.

Figure 6:
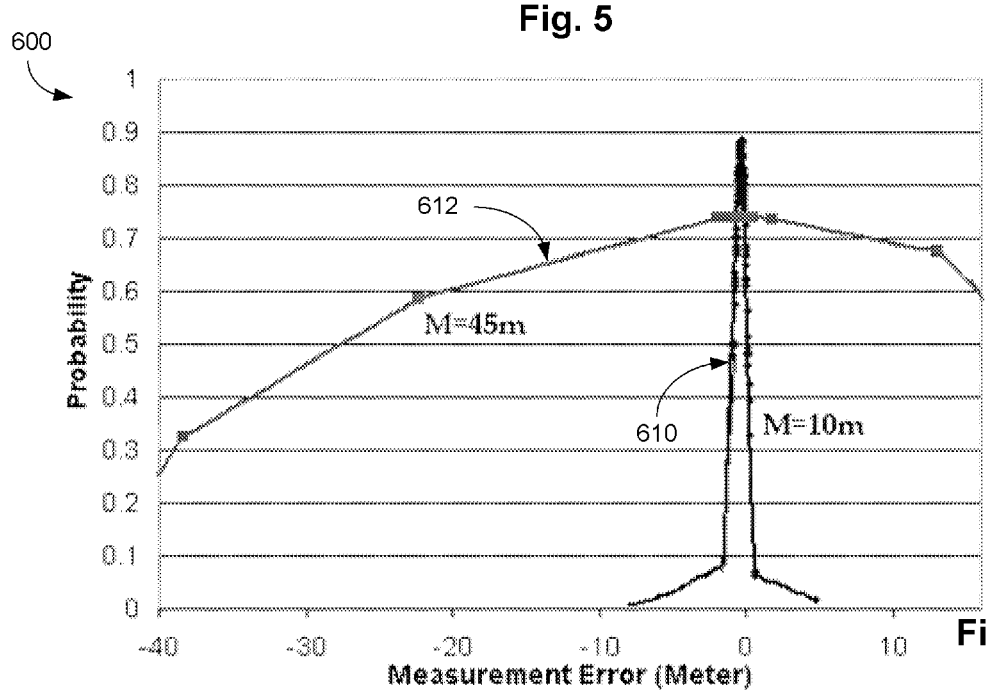
FIG. 6 illustrates another example distance measurement model.

FIG. 6 illustrates another example distance measurement model 600, in accordance with various embodiments of the present disclosure. The model 600 of FIG. 6 illustrates an alternative view of the measurement model 500 of FIG. 5. The x-axis of FIG. 6 may represent measurement error values, and y-axis may illustrate the probability distribution function (PDF) for various example distance measurement. For example, FIG. 6 includes plots 610 and 612 for distance measurement of 10 m and 45 m, respectively. As observed from plot 612, for a distance measurement of 45 m, there may be a 75% probability that the measurement may have an error of approximately 7 m.

Outdoor and Indoor Terrain Models

In various embodiments, estimation of distance between two nodes and subsequent estimation of location of a communication node may be based at least in part on the terrain in which the nodes may be deployed. For example, some or all the nodes may be deployed in an indoor terrain and/or an outdoor terrain, with one or more obstacles (e.g., trees, buildings, walls, etc.) in the environment that may hinder communication between two nodes, as discussed with respect to FIG. 2. To more accurately depict the terrain in which the nodes may be deployed, an outdoor and an indoor terrain model may be simulated that may be scalable both in terms of size and resolution and may mimic an actual terrain to the extent possible, and both the models may be parameterized in terms of size, resolution, density and level of clustering of the obstacles.

Figure 7:
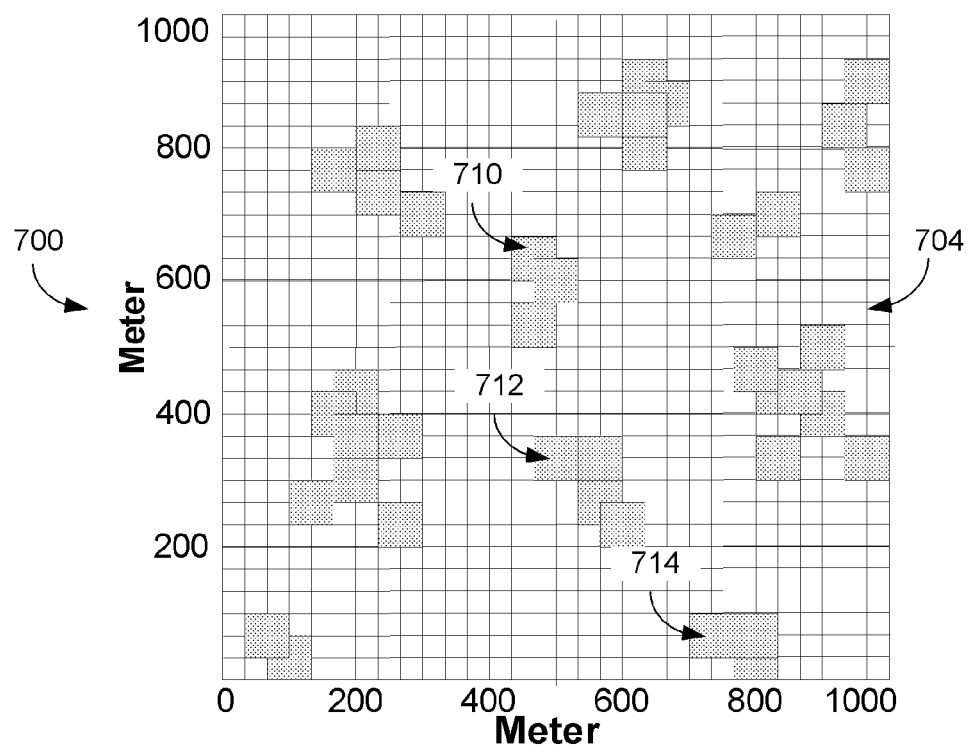
FIG. 7 illustrates an example outdoor terrain model.

FIG. 7 illustrates an example outdoor terrain model 700, in accordance with various embodiments of the present disclosure. The outdoor terrain model 700 illustrates an example simulated outdoor terrain of size 1000 m×1000 m. The simulated model may be divided in a number of grids (e.g., grid 704) and the grey portions in the model 700 may depict obstacles (e.g., obstacles 710, 712 and 714), e.g., buildings, trees, buses, etc. In various embodiments, the outdoor terrain model may employ a number of modeling paradigms, including but not limited to statistical fractals and interacting particles. Fractals may ensure that for individual levels of resolution, the terrain may be statistically isomorphic. Also, interacting particles may be used as the mechanism to maintain a specified density of obstacles and to create a specified level of clustering in order to enforce self-similarity at different levels of granularity.

In various embodiments, the outdoor terrain model 700 may be created using an iterative procedure. The obstacles may be generated based at least in part on an assumption that obstacles are mutually attracted. In various embodiments, the model may be generated iteratively on a fine grid, one obstacle at a time, till a user specified density may be achieved. During individual steps of the iterative process, the position of the next grid cell may be selected proportional to the weight of the grid according to a user specified cluster factor (CF). The outdoor terrain model 700 may be generated with CF=5. The weight of individual unoccupied grid cell may be the weighted sum of the impact of its eight neighboring grid cells. Occupied horizontal and vertical neighboring grid cells may have an impact of $\sqrt{CF}$, and diagonal neighboring grid cells may have an impact of CF, although any other appropriate impact factor may be used for one or more neighboring cells. If the weight of an unoccupied cell exceeds a threshold level, the unoccupied cell may change to an occupied status. A cluster factor CF=1 may result in uniformly distributed obstacles. For a relatively higher CF, the probability of forming one or more large obstacle may be higher.

Figure 8:
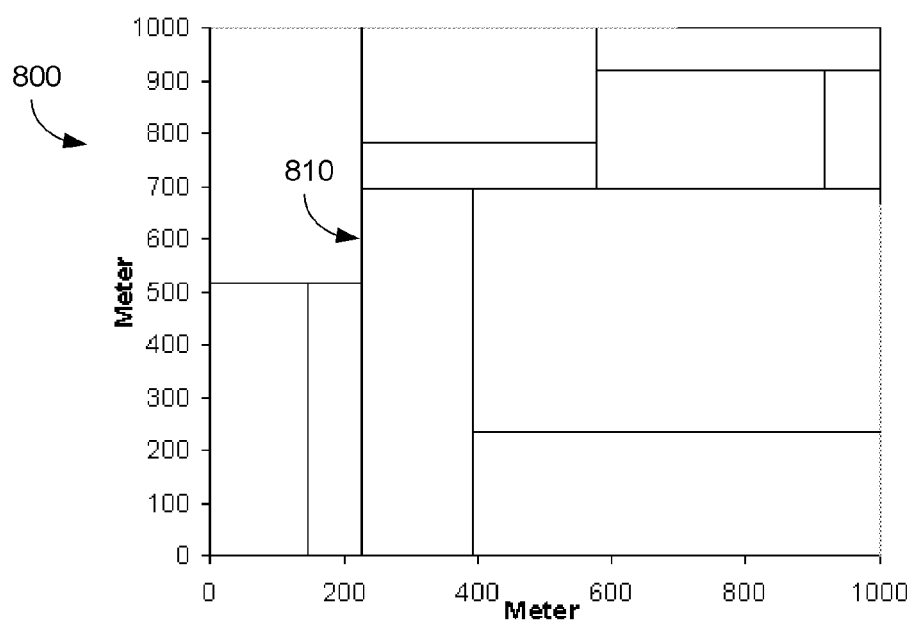
FIG. 8 illustrates an example indoor terrain model.

FIG. 8 illustrates an example indoor terrain model 800, in accordance with various embodiments of the present disclosure. The simulated indoor terrain model may be 1000 m×1000 m, and may include obstacles in the form of walls (e.g., wall 810). In various embodiments, the walls may be generated by recursively partitioning the space in rectangles by following a triangle shaped probability distribution function. A user specified threshold may be used to prevent the walls from being placed too close to each other. For example, during the iterative generation of the model 800, any proceeding two partitions may have a user specified minimum threshold area ratio R. For example, for R=1/9, any partition that divides the space into $\leq 10\%$ and $\geq 90\%$ of its original size may not be allowed. Although not illustrated in FIG. 8, the indoor model 800 may also include obstacles (other than walls), e.g., furniture, staircase, etc. and may be generated using the iterative process discussed with respect to the outdoor terrain model.

Location Discovery (LD) Error Model

As previously discussed, the estimation of distance between two nodes may have a probability of error, which may also introduce error in the location discovery (e.g., a difference between the actual location and an estimated location) of a communication node.

In various embodiments, it may be intended to generate a location discovery (LD) error model that may correlate one or more attributes of individual communication nodes with the error in estimating the location of respective communication nodes. For example, an LD model may correlate the number of neighboring nodes of individual communication nodes with the error in estimating the location of the respective communication nodes.

Figure 9A:
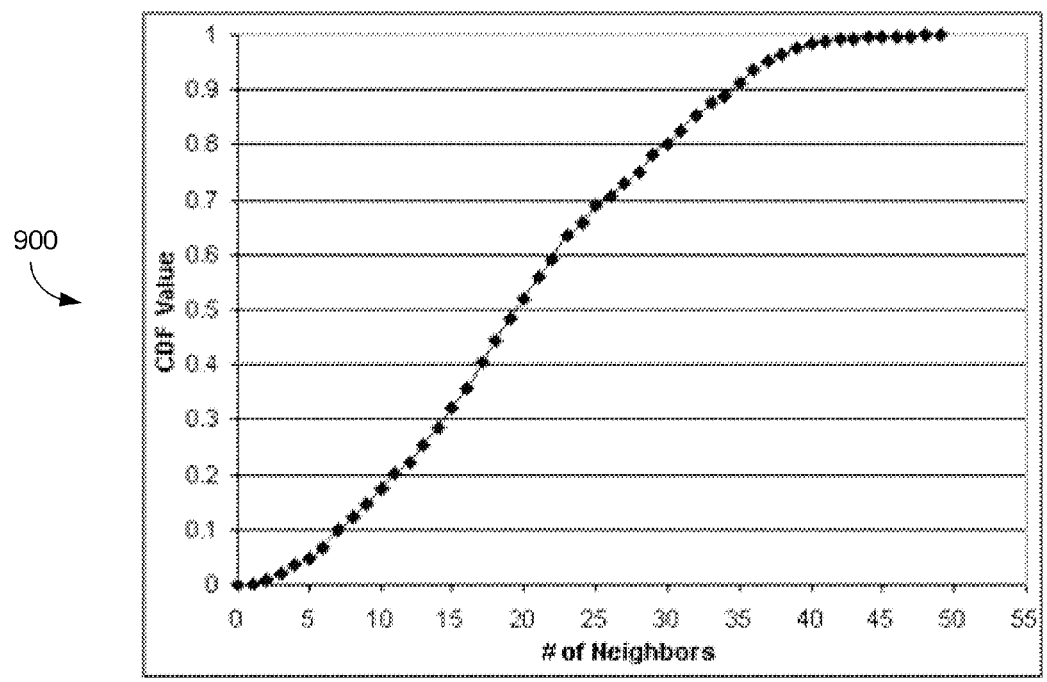
FIG. 9a illustrates an example model that includes correlation between a number of neighboring nodes of individual communication nodes and a corresponding cumulative density function (CDF) values.

FIG. 9a illustrates an example model 900 that includes correlation between the number of neighboring nodes (e.g., including neighboring communication nodes and/or neighboring beacon nodes) of individual communication nodes and the corresponding CDF values for a plurality (e.g., 1,000) communication nodes, in accordance with various embodiments of the present disclosure. In various embodiments, the model 900 may be generated using a simulated scenario, where 1,000 communication nodes may be randomly deployed in an example terrain.

Figure 9B:
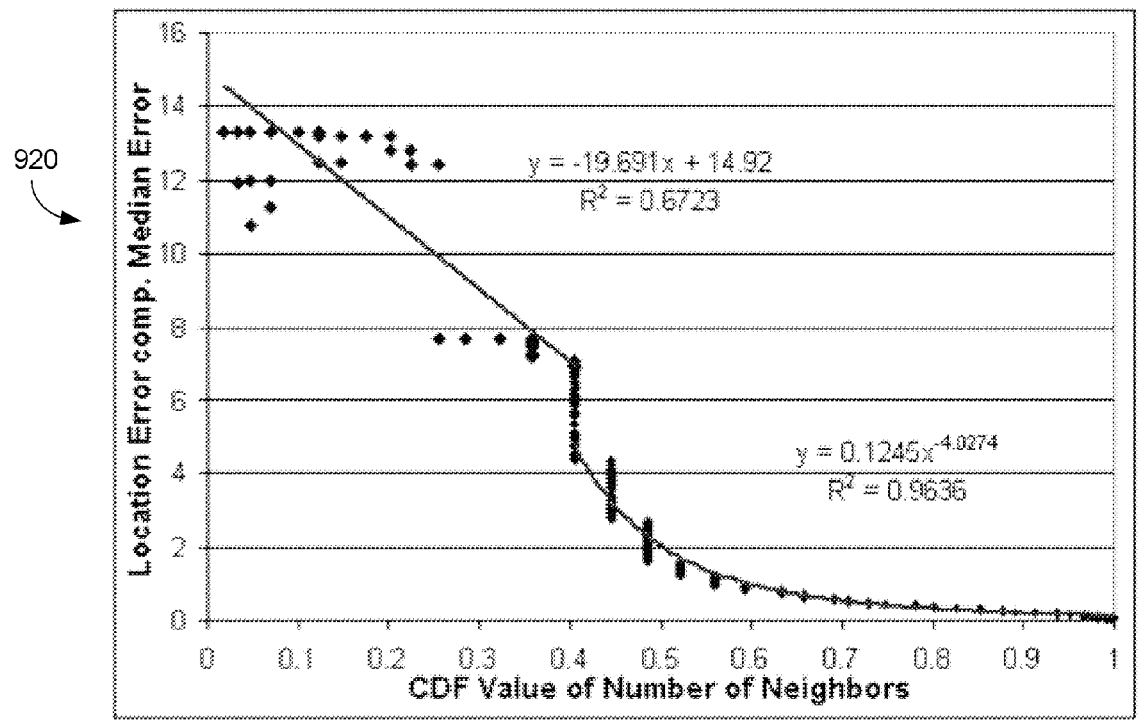
FIG. 9b illustrates an example location discovery error model that includes correlation between the CDF values of number of neighboring nodes of individual communication nodes and the corresponding location estimation error.

FIG. 9b illustrates an example location discovery error model 920 that includes correlation between the CDF values of number of neighboring nodes of individual communication nodes and the corresponding location estimation error for 1,000 communication nodes, in accordance with various embodiments of the present disclosure. The model 920 also illustrates least squares fit trend lines, along with corresponding $R^2$ values.

As will be readily understood in light of the present disclosure, in various embodiments, the models of FIGS. 9a and 9b may be generated through simulation, at least partially in line with the method previously discussed with respect to generation of the distance measurement error model.

In various embodiments, it may be possible to estimate, from models 900 and 920, an average location estimation error of a communication node if the number of neighboring nodes of such a communication node is known. It may be observed from FIGS. 9a and 9b that as the average number of neighboring nodes may increase, the corresponding resultant location estimation error may decrease. As the CDF values of FIGS. 9a and 9b correlate the number of neighboring nodes of individual communication node with average location estimation error of the respective communication nodes, the CDF values will henceforth be denoted by $CDF_N$.

Although not illustrated in FIGS. 9a and 9b, other attributes of individual communication nodes may also be correlated with the corresponding location estimation error to create other location discovery error models. For example, it may be possible to generate a location discovery error model that may correlate the number of neighboring beacon nodes of individual communication nodes (or a corresponding CDF value) with average location estimation error of the respective communication nodes, and the associated CDF may be referred as $CDF_{BN}$ henceforth. For example, a communication node with higher number of neighboring beacon nodes may have a lower average location discovery error.

Figure 10A:
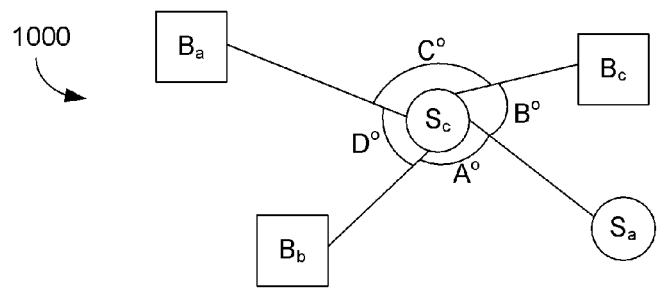
FIG. 10a illustrates an example wireless network.

In various embodiments, the average location discovery error of a communication node may also be based at least in part on the third largest angle of its neighbors. FIG. 10a illustrates an example wireless network 1000 in accordance with various embodiments of the present disclosure. In the wireless network 1000, the angles formed by the neighboring nodes of the communication nodes Sc may be given by A°, B°, C°, and D°. As illustrated, angle A° may be the third largest angle of the four angles. Thus, for a node Sc, the angles between all possible pairs of neighbors of Sc with respect of Sc may be calculated, and third largest angle A° may be determined accordingly. For example, assume a set of nodes S={Si}, i=1, . . . , $N_S$. For individual node Si∈S, the third largest angle Ai° may be determined.

Figure 10B:
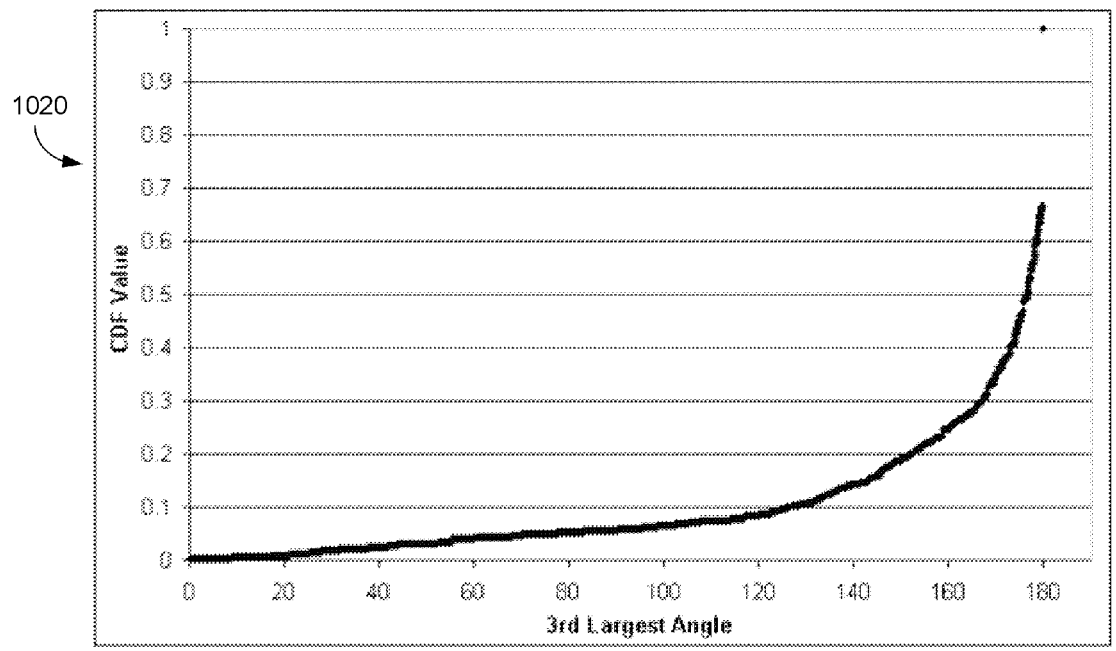
FIG. 10b illustrates an example model that includes correlation between the third largest angle of neighboring nodes of individual communication nodes and the corresponding CDF values.
Figure 10C:
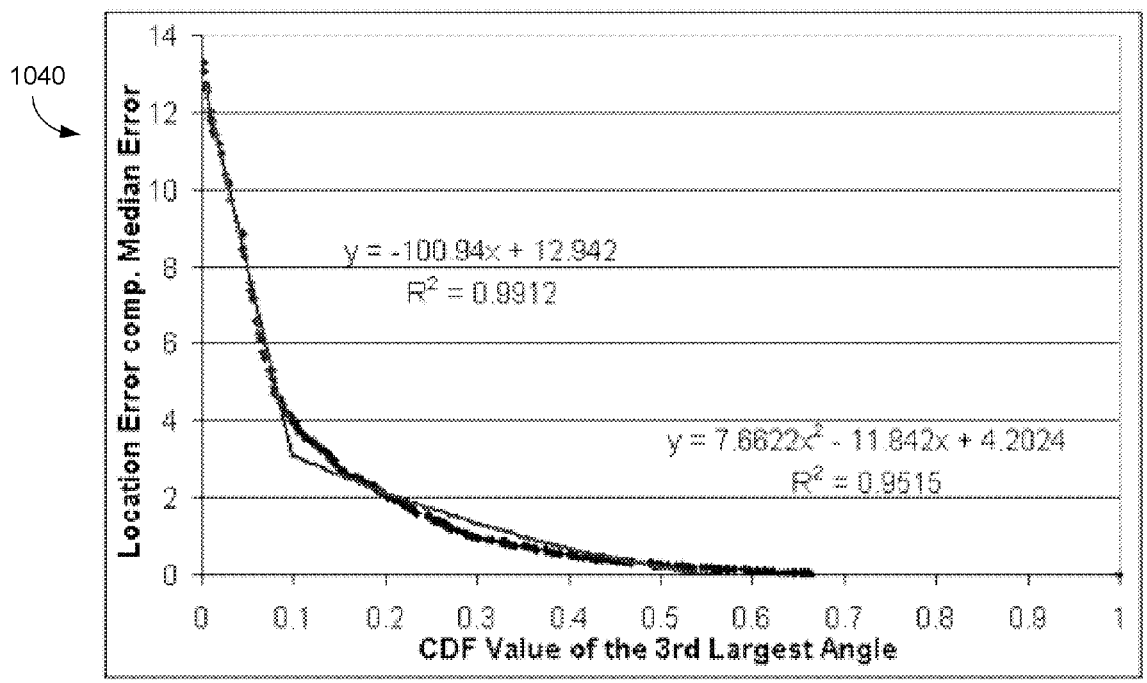
FIG. 10c illustrates an example location discovery error model that includes correlation between the CDF values of the third largest angle of neighboring nodes of individual communication nodes and the corresponding location estimation error.

FIG. 10b illustrates an example model 1020 that includes correlation between the third largest angle of neighboring nodes of individual communication nodes and the corresponding CDF values for a plurality (e.g., 1,000) of communication nodes, in accordance with various embodiments of the present disclosure. FIG. 10c illustrates an example location discovery error model 1040 that includes correlation between the CDF values of the third largest angle of neighboring nodes of individual communication nodes and the corresponding location estimation error for a plurality (e.g., 1,000) of communication nodes, in accordance with various embodiments of the present disclosure. The models 1020 and 1040 may measure how collinear a communication nodes node's neighbors may be, and the communication nodes that may be relatively well surrounded may have a higher probability of being located relatively more accurately than others. For example, if a communication node has three neighbors that may be relatively far apart and spread out (e.g., relatively triangulated neighbors), this may create a relatively more restrictive solution space for the unknown communication node's location when compared to a communication node that has nearly collinear neighboring nodes.

In various embodiments, the models of FIGS. 9a and 9b may be generated through simulation by determining, for individual nodes Si in the set of communication nodes S={Si}, i=1, . . . , $N_S$, the corresponding third largest angle Ai°. Subsequently, the CDF plot of FIG. 10b may be generated based on Ai, i=1, . . . , $N_S$, wherein for any given communication node with third largest angle Ai, the corresponding CDF value may be denoted by $CDF_{Angle}(Si)$ or as $CDF_A(Si)$. Subsequently, individual communication node Si's relative location errors $\epsilon_i$, i=1, . . . , $N_S$, may be correlated against $CDF_A(Si)$, as illustrated in the plot in FIG. 10c. FIG. 10c also illustrates least square fit trend lines, along with corresponding R2 values.

Figure 11:
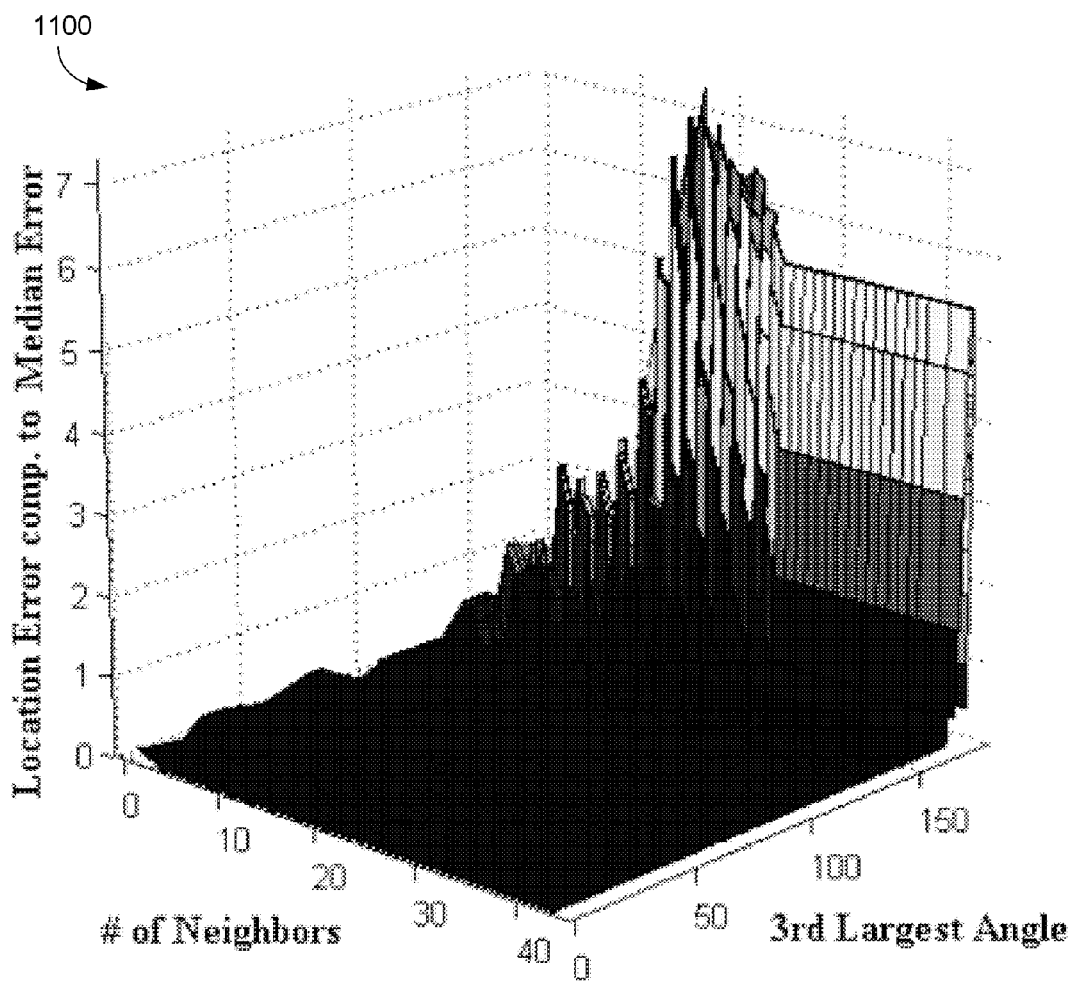
FIG. 11 illustrates an example location discovery error model that includes correlation between the third largest angle of neighboring nodes of individual communication nodes, the number of neighboring nodes of corresponding communication nodes, and the location estimation error of the corresponding communication nodes.

FIG. 11 illustrates an example location discovery error model 1100 that includes correlation between the third largest angle of neighboring nodes of individual communication nodes, the number of neighboring nodes of corresponding communication nodes, and the location estimation error of the corresponding communication nodes, in accordance with various embodiments of the present disclosure. In various embodiments, the 3-D plot in model 1100 may be generated by combining the 2-D plots of FIGS. 9a, 9b, 10a and 10b. From model 1100, an average location estimation error of a communication node may be determined if the third largest angle of neighboring nodes and the number of neighboring nodes of such a communication node is known.

Although not illustrated in the figures, other attributes of individual communication nodes may be correlated with the corresponding location estimation error. For example, for a lower average distance measurement to three closest beacon nodes from a communication node, the average location discovery error may be lower for such a communication node. In various embodiments, for a communication node that may have a higher total hop count to other nodes in the network from the communication node, the average location discovery error for such a communication node may be higher. A LD model, along with a plot illustrating correlation of these attributes of individual communication nodes with the corresponding location estimation error, may be generated in line with FIGS. 9a, 9b, 10a and/or 10b.

LDI:Beacon Node Placement

As discussed earlier with respect to FIG. 3, in various embodiments, one or more beacon nodes may form an LDI, which may aid in determining locations of one or more communication nodes in a network. Thus, an LDI may include a relatively small number of beacon nodes in a terrain that may permit any arbitrary communication node in the terrain to locate itself. In various embodiments, beacon placement may be a part of building an LDI, and the beacon placement problem may include determining the minimum number and position of beacon nodes required for a known terrain, such that one or more communication nodes placed at any location in the terrain may receive signals from at least three neighboring beacon nodes, to permit location estimation of the one or more communication nodes.

Figure 12:
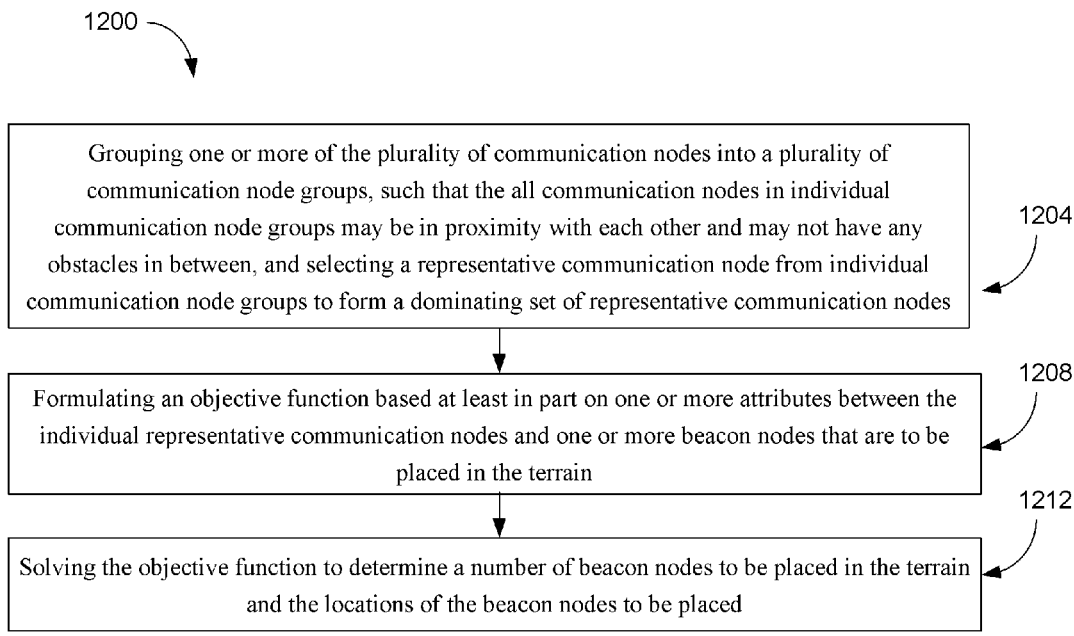
FIG. 12 illustrates an example method for determining a plurality of locations in a terrain to place a corresponding plurality of beacon nodes.

FIG. 12 illustrates an example method 1200 for determining a plurality of locations in a terrain to place a corresponding plurality of beacon nodes, in accordance with various embodiments of the present disclosure. Various ones of these embodiments may be instantiated on a computing device, that is, practicing the method on a computing device provided with the decision logic to be described. In various embodiments, the method 1200 may include one or more of functions or processing operations illustrated by blocks 1204, 1208 and/or 1212.

At block 1204, one or more of a plurality of communication nodes may be grouped into a plurality of communication node groups, such that the all communication nodes in individual communication node groups may be in proximity with each other and may not have any obstacles in between. In various embodiments, the grouping in block 1204 may be performed by randomly generating a plurality of communication nodes in a known terrain. The communication nodes may be generated, for example, such that the generated communication nodes may not overlap with a known obstacle. The location of the generated communication node may be known to the respective communication nodes or to a centralized object (e.g., a server, a user of the network, a computing device, or the like) of the network.

The grouping at block 1204 may be performed, for example, such that all communication nodes in individual communication node groups may be in close proximity, without any obstacles in between, and all such communication nodes may have one or more common beacon nodes as neighboring nodes. In various embodiments, the grouping may be performed using information about the terrain.

In various embodiments, block 1204 may also include selecting a respective representative communication node from respective individual communication node groups to form a dominating set of representative communication nodes. For at least the purpose of building an LDI and unless otherwise mentioned, the representative communication node of a communication node group may represent other communication nodes in the communication node group. In various embodiments, the number of representative communication nodes in the dominating node may be substantially equal to the number of communication node groups. In various embodiments, the representative communication node of a communication node group may have one or more properties that may be similar to other communication nodes in the communication node group (e.g., having one or more common neighboring beacon nodes, being in close proximity with communication nodes in the group, etc.).

In various embodiments, the grouping of the communication nodes and formation of the domination set may be performed using, for example, integer linear programming (ILP). For example, $S=\{S_i\}$, $i=1, \ldots, N_S$, may be the plurality of communication nodes that may be divided in $N_{DS}$ number of groups so that the dominating set $DS=\{DS_i\}$, $i=1, \ldots, N_{DS}$. In various embodiments, a constant $E_{ij}$ may denote whether nodes Si and Sj share the same set of three beacon nodes, and a variable may di denote whether node Si is selected in the dominating set (i.e., whether Si is a representative communication node). An objective function may be formulated to generate the communication node groups and select the dominating set as follows:

$$E_{ij} = \begin{cases} 1, & \text{if communication nodes } Si \text{ \&} Sj \text{ receive acoustic} \\ & \text{signals from the same set of three beacons} \\ 0, & \text{otherwise} \end{cases}$$

$$d_i = \begin{cases} 1, & \text{if communication node } Si \text{ is selected in the} \\ & \text{dominating set} \\ 0, & \text{otherwise} \end{cases}$$

$$OF: \min \sum_{i=1}^{N_S} d_i$$

$$\text{such that: } \sum_{i=1}^{N_S} d_j E_{ij} \geq 1, \quad i=1, \ldots, N_S.$$

The objective function, thus, may minimize and/or reduce the number of representative communication nodes in the dominating set (e.g., minimize and/or reduce the number of communication node groups). The constraint may ensure that for any individual communication node Si, either Si may be in the dominating set or there may be at least one communication node Sj in the dominating set, such that Si and Sj may receive signals from the same set of three neighboring beacon nodes (e.g., $E_{ij}=1$, and Sj may be the representative communication node, representing communication node Si in the dominating set).

The method 1200 may further include, at block 1208, formulating an objective function based at least in part on one or more attributes between individual representative communication nodes and one or more beacon nodes that are to be placed in the terrain. In various embodiments, the objective function may be formulated using non-linear programming. The unknown variables may be the coordinates of the set of beacon nodes $B=\{Bi\}$, $i=1, \ldots, NB$, (with coordinates ($X_{Bi}$, $Y_{Bi}$), $i=1, \ldots, NB$) that are to be placed in the terrain. In various embodiments, the objective function may reduce and/or minimize an expected location discovery error of representative communication nodes based at least in part on one or more attributes between the individual representative communication nodes and one or more beacon nodes in the set B.

An example objective function formulated in block 1208 may be $$OF: \min F_1 = \sum_{i=1}^{N_{DS}} M_i(CDF_N(DS_i)),\qquad\text{Equation 3}$$

where the function F1 may be based at least in part on a location discovery error model that may correlate the number of neighboring nodes (or the associated $CDF_N$ value) of individual representative communication nodes and respective location discovery error (e.g., from model 920 of FIG. 9*b*). For example, $CDF_N(DSi)$ may be the CDF value associated with the number of neighboring nodes of the representative communication node DSi in the dominating set DS, where the $CDF_N(DSi)$ may be determined from, for example, model 900 of FIG. 9*a*. Function $M_1$ may map the $CDF_N(DSi)$ to the corresponding average location discovery error for the communication node DSi and may be determined, for example, from the location discovery error model 920 of FIG. 9*b*.

In various embodiments, individual representative communication nodes may have at least three neighboring beacon nodes. Accordingly, an additional term F2 may be added to equation 3, where F2 may be equal to $M_2(CDF_{BN}(DSi))$, where $CDF_{BN}$ may be the CDF value associated with the number of neighboring beacon nodes of the representative communication node DSi in the dominating set DS. Determination of $CDF_{BN}$ may be performed in a manner similar to determination of $CDF_N$, as has been discussed herein earlier. Function $M_2$ may map the $CDF_{BN}(DSi)$ to the corresponding average location discovery error for the communication node DSi. Accordingly, a modified objective function may be:

$$OF: \min F = W \cdot F_2 + F_1 \qquad\text{Equation 4,}$$

where W may be an appropriate weighing factor that may emphasize F2 to ensure that individual representative communication nodes may have at least three neighboring beacon nodes, prior to considering minimizing or reducing the expected location error (e.g. F1).

In various embodiments, the objective function of equation 4 may be extended to include additional attributes between individual representative communication nodes and one or more beacon nodes that are to be placed in the terrain. For example, an additional term may be included in the objective function to take into account the third largest angle of all neighboring nodes of a representative communication node (as determined, for example, in FIGS. 10*a*-10*c* and the previously described $CDF_A$ value).

The method 1200 may further include, at block 1212, solving the objective function to determine a minimum required number of beacon nodes for the terrain, and locations in the terrain to place the minimum number of beacon nodes. The solving may be performed using one or more available non-linear programming tools or software. For example, the solving may be performed using publicly available optimization software WNLIB, which is an ANSI C subroutine library that includes numerical routines such as conjugate-gradient and conjugate-directions, simplex method, etc. and available at http://www.willnaylor.com/wnlib.html. Other non-linear programming tools and programs may also be used for the solving at block 1212.

LDI:Beacon Node Assignment

As discussed earlier with respect to block 308 of method 300 of FIG. 3, after the placement of the beacon nodes in the terrain may be determined, the beacon nodes may be divided in one or more beacon node groups, based at least in part on the placed beacon nodes within individual beacon node groups being able to be active simultaneously without causing interference or collision at the individual communication nodes of the plurality of communication nodes. An example criterion for grouping the beacon nodes may be that a pair of beacon nodes Bi and Bj may not transmit simultaneously if the pair causes any receiving communication node to have collision. For example, if at least one communication node Sa receives transmission from the both beacon nodes Bi and Bj, then the beacon nodes Bi and Bj may not transmit simultaneously (e.g., may be placed in separate beacon node groups) to avoid chances of collision or interference at the receiving communication node Sa.

Figure 13:
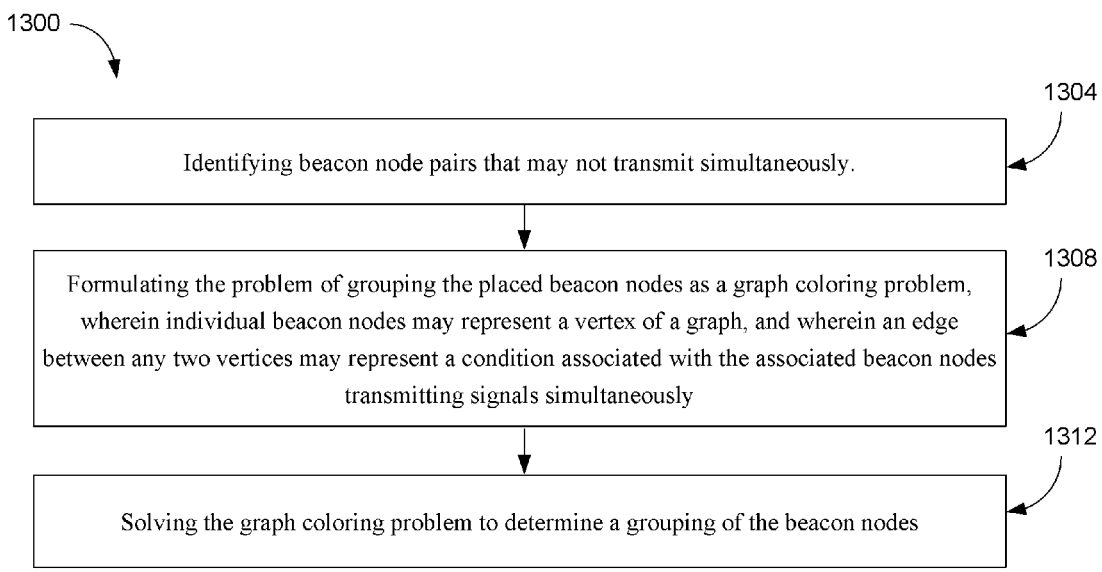
FIG. 13 illustrates an example method for determining a plurality of beacon node groups for the placed beacon nodes.

FIG. 13 illustrates an example method 1300 for determining a plurality of beacon node groups for the placed beacon nodes, in accordance with various embodiments of the present disclosure. Various ones of these embodiments may be instantiated on a computing device, that is, practicing the method on a computing device provided with the decision logic to be described. In various embodiments, the beacon nodes may be grouped based at least in part on the placed beacon nodes within individual beacon node groups being able to be active simultaneously without causing interference or collision at the individual communication nodes of the plurality of communication nodes. In various embodiments, the method 1200 may include one or more of functions or processing operations illustrated by blocks 1304, 1308 and/or 1312.

At block 1304, beacon node pairs that may not transmit simultaneously are identified. For example, if a communication node Sa receives signals from beacon nodes Bi and Bj and uses the received signals from beacon nodes Bi and Bj to determine the location of the communication node Sa, then the beacon node pair Bi and Bj may not transmit simultaneously. In various embodiments, for individual pairs of beacon nodes, it may be determined whether the pair of beacon nodes may transmit simultaneously. In various embodiments, binary variable Rij may represent a user specified condition that may restrain the pair of beacon nodes Bi and Bj from transmitting simultaneously. For example, $$R_{ij} = \begin{cases} 1, & \text{if beacons } Bi \text{ and } Bj \text{ may not transmit simultaneously} \\ 0, & \text{otherwise} \end{cases}$$

In various embodiments, $R_{ij}$ may be determined for $i=1, \ldots, N_B$, and $j=1, \ldots, N_B$, where $N_B$ may be the total number of beacon nodes to be placed in the terrain.

The method 1300 may include, at block 1308, formulating the problem of grouping the placed beacon nodes as a graph coloring problem. Graph coloring is a graph labeling formulation used in graph theory, integer linear programming, or the like. In various embodiments, during the formulation at block 1304, individual beacon nodes may, for example, represent a node or vertex of a graph. An edge between any two vertices in the graph may represent a condition associated with the associated beacon nodes transmitting signals simultaneously. For example, if Rij=1 (e.g., if beacon nodes Bi and Bj may not transmit simultaneously), then the edge connecting the $i^{th}$ and $j^{th}$ vertices (representing beacon nodes Bi and Bj, respectively) of the graph may be approximately equal to 1.

The method 1300 may include, at block 1312, solving the graph coloring problem to determining a grouping of the beacon nodes. In various embodiments, the graph coloring problem may be solved using tools available in graph theory. In various embodiments, the graph coloring problem may be solved to determine, for example, a minimum number of colors (e.g., T number of colors) needed to color the entire graph, wherein individual colors may represent respective beacon node groups BG={BGi}, i=1, . . . , T. Thus, the minimum number of colors utilized may represent the minimum number of beacon node groups. The minimum number of colors utilized may also represent the minimum total number of time slots that may be used for all the beacon nodes to transmit acoustic signals at least once (e.g., one time slot for a respective beacon node group). For individual colors, the associated vertices (e.g., associated beacon nodes) may also be identified, which may represent the beacon nodes included in the respective beacon node groups. That is, the beacon nodes that may be colored by the same color may form a beacon node group, and these beacon nodes may transmit signals simultaneously.

Although the beacon node grouping in method 1300 may be solved using graph coloring, any other appropriate integer linear programming tools may also be used (instead of and/or in addition to graph coloring) for grouping the beacon nodes, as will be readily understood based on the teachings provided in this disclosure.

LDI:Beacon Node Broadcast Scheduling

As discussed earlier with respect to block 312 of method 300 of FIG. 3, after the placement of the beacon nodes in the terrain and the grouping of the beacon nodes may be determined, a schedule for activating the beacon node groups may also be determined, based at least in part on a waiting time of a communication node to receive location determination signals from a plurality of beacon nodes. For example, as earlier discussed, there may be T number of beacon node groups BG={BGi}, i=1, . . . , T, with individual beacon node groups being assigned a respective time slot t (where $1 \leq t \leq T$). For individual round of transmissions, beacon nodes in a beacon node group may transmit signals in the time slot assigned to the group. Thus, each round of transmission may include T time slots (one for respective beacon node group). For example, the $t^{th}$ beacon node group $BG_t$ may transmit at time slots t, (t+T), (t+2T), . . . and so on.

In various embodiments, $N_{DS}$ may represent the number of representative communication nodes in the dominating set DS, so that individual representative communication nodes in the dominating set DS is represented by {DSi}, i=1, . . . , $N_{DS}$. For individual representative communication nodes DSi, constant Fi (i=1, . . . , $N_{DS}$) may represent the group of communication nodes that DSi may represent. That is, DSi be the representative communication node of the communication node group Fi (e.g., see block 1204 of method 1200), and Fi may represent the group of communication nodes that, along with representative communication node DSi, may have a common set of neighboring beacon nodes. In various embodiments, BFi={BGi1, BGi2, BGi3}, where BGi1, BGi2, BGi3 may be three beacon node groups that include three respective beacon nodes that may serve the group of communication nodes Fi, i=1, . . . , $N_{DS}$. Thus, BFi may represent the set of beacon node groups that may include beacon nodes that serve individual communication nodes of the communication node group Fi. For example, BF2={5, 2, 8} may imply that the group of communication nodes F2 may rely on three neighboring beacon nodes that belong to beacon node groups 5, 2 and 8, respectively. In various embodiments, integer variable t[BGij] may denote the time slot in which the beacon node group BGij may transmit, $1 \leq t[BGij] \leq T$.

In various embodiments, one of the criteria used for determining a beacon broadcast schedule may be to reduce or minimize the power consumption of one or more communication nodes that may receive signals transmitted by the beacon nodes. For example, one of the objectives may be to reduce or minimize a time individual communication node's receiver may have to be active, i.e. the time of receiving the acoustic signals from three beacon nodes.

For example, in an example situation, for individual rounds of beacon transmission, there may be 9 time slots (e.g., for 9 different beacon node groups). During a first example scenario, a group of communication node (e.g., communication node group F2) may receive transmission from neighboring beacon nodes at time slots 1, 2, and 5 (and may keep on receiving signals in time slots 10, 11, 14, 19, 20, 23, etc. during subsequent rounds of signal transmission). Individual communication nodes in the communication node group F2 may be active (e.g., enabled to receive signals from neighboring beacon nodes) during time slots 1-5 (and also during time slots 10-14, 19-23, etc. subsequent rounds of signal transmission), and may be inactive (e.g., configured not to receive any beacon node signals) during time slots 6-9 (and also during time slots 15-18, 24-28, etc. subsequent rounds of signal transmission). For the purpose of this disclosure and unless otherwise specified, a maximum active period of a communication node may refer to a maximum number of consecutive time slots the communication node may remain active for receiving signals from neighboring beacon nodes. For example, if a communication node uses signals received from M (e.g., 3) beacon nodes (B1, B2, ..., BM) for determining the location of the communication node and the communication node receives the signals in that order (B1, B2, ..., BM), the maximum active period of the communication node may include the time slot when a first beacon node signal may be received (e.g., B1), the time slot when a last beacon node signal may be received (e.g., BM), and any intervening time slots in between the two time slots (e.g., when signals from B2, ..., B(M−1) are received). For example, for the first example scenario, the maximum active period of communication nodes in group F2 may be 5 time slots.

During a second example scenario, the communication node group F2 may receive transmission from neighboring beacon nodes at time slots 2, 3, and 4 for each round of beacon node transmission (and also during time slots 11, 12, 13, 20, 21, 22, etc.). Hence, individual communication nodes in the communication node group F2 may be active during time slots 2-4 (and also during 11-13, 20-22, etc.), and may be inactive during time slots 4-10 (and also during 14-19, 23-28, etc.). In the second example scenario, the individual communication nodes in the communication node group F2 may have to remain active for less time as compared to the first example scenario. For the second example scenario, the maximum active period of communication nodes in group F2 may be 3 time slots.

In various embodiments, a beacon broadcasting schedule may be developed that may reduce, minimize and/or optimize the time the individual communication nodes may have to be active to receive acoustic signals from neighboring beacon nodes.

In various embodiments, signals from three beacon nodes from respective three beacon node groups BGi1, BGi2, BGi3 may arrive at communication nodes included in a communication node group Fi in the same order (e.g., BGi1, BGi2, BGi3). An objective function may be given as:

$$OF:\min H_1 = \max\{|t[BG_{i1}]-t[BG_{i2}]|, |t[BG_{i1}]-t[BG_{i3}]|, |t[BG_{i2}]-t[BG_{i3}]|\}, i=1, \ldots, N_{DS} \quad \text{Equation 5.}$$

In various embodiments, the maximum (e.g., "max") function may be implemented by introducing another variable v, wherein $v \geq |t[BG_{i1}]-t[BG_{i2}]|$, $v \geq |t[BG_{i1}]-t[BG_{i3}]|$, and $v \geq |t[BG_{i2}]-t[BG_{i3}]|$. The variable v may be subject to minimization. In various embodiments, the objective function may be to reduce or minimize the maximum active period of the communication nodes.

In various embodiments, the communication nodes in the group of communication nodes Fi may receive transmission from beacon nodes included in the beacon node groups BGi1, BGi2, BGi3 in any other order as well (e.g., BGi2, BGi1, BGi3). Accordingly, there may be six additional sets of equations (that may be of the same form as equation 5), in which either any one or two beacon node groups (in any combination) may have the total number of time slots T added. For example, $$H_2 = \max\{|(t[BG_{i1}]+T)-t[BG_{i2}]|, |(t[BG_{i1}]+T)-t[BG_{i3}]|, |t[BG_{i2}]-t[BG_{i3}]|\}, i=1, \ldots, N_{DS} \quad \text{Equation 6.}$$

Equation 6 (i.e., the term $H_2$) may be associated with an example situation where signals are received from beacon nodes belonging to beacon node groups BGi2, BGi3, BGi1, in that order. Another example equation in which the term T may be added to two beacon node groups may be given as:

$$H_3 = \max\{|(t[BG_{i1}]+T)-t[BG_{i2}]|, |(t[BG_{i1}]+T)-(t[BG_{i3}]+T)|, |t[BG_{i2}]-(t[BG_{i3}]+T)|\}, i=1, \ldots, N_{DS} \quad \text{Equation 7.}$$

Let Hi, i=1, ..., 7 denote the maximum of the individual equations. In various embodiments, an objective function may be given by:

$$OF:\min\{H_1, H_2, \ldots, H_7\} \quad \text{Equation 8.}$$

Thus, equation 8 may minimize or reduce a waiting time (i.e., the time a communication node may have to be active and waiting for beacon signals), and/or minimize or reduce a maximum active period of individual communication nodes. In various embodiments, a modified version of the objective function may reduce or minimize an average waiting time individual representative communication nodes in the dominating set DSi (and therefore, the communication nodes that the representative communication node DSi represents) have to wait in order to receive acoustic signals from at least three neighboring beacon nodes. In various embodiments, it may also be possible to minimize energy from the beacon node's perspective, by reducing or minimizing a number of times each beacon node transmits, while satisfying the constraints.

In various embodiments, equations 5-8 may be solved using integer linear programming, graph coloring, or the like, known to those skilled in the art.

Figure 14:
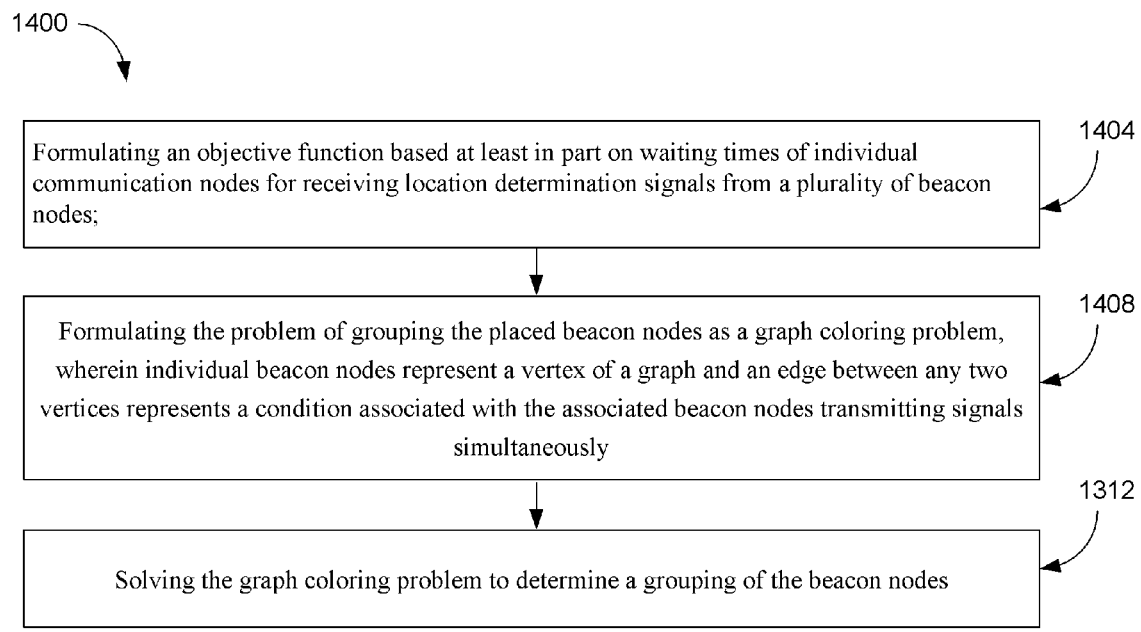
FIG. 14 illustrates an example method for scheduling signal transmission of a plurality of beacon nodes.

FIG. 14 illustrates an example method 1400 for scheduling signal transmission of a plurality of beacon nodes, in accordance with various embodiments of the present disclosure. Various ones of these embodiments may be instantiated on a computing device, that is, practicing the method on a computing device provided with the decision logic to be described. The method 1400 may include one or more function or processing operations as illustrated by blocks 1404, 1408 and/or 1412.

At block 1404, formulating an objective function (e.g., objective functions of equations 5, 6, 7 and/or 8) based at least in part on waiting times of individual communication nodes for receiving location determination signals from a plurality of beacon nodes. In various embodiments, the objective function may reduce or minimize the waiting time. In various embodiments, the objective function reduce or minimize the maximum active periods of individual communication nodes, wherein the maximum active period of a communication node may be the time a communication node remains active for receiving signals from neighboring beacon nodes.

The method 1400 may include, at 1408, solving the objective function to determine a schedule for signal transmission of the plurality of beacon nodes. In various embodiments, the objective function may be solved, for example, using integer linear programming, graph coloring, or the like.

Computing System

Figure 15:
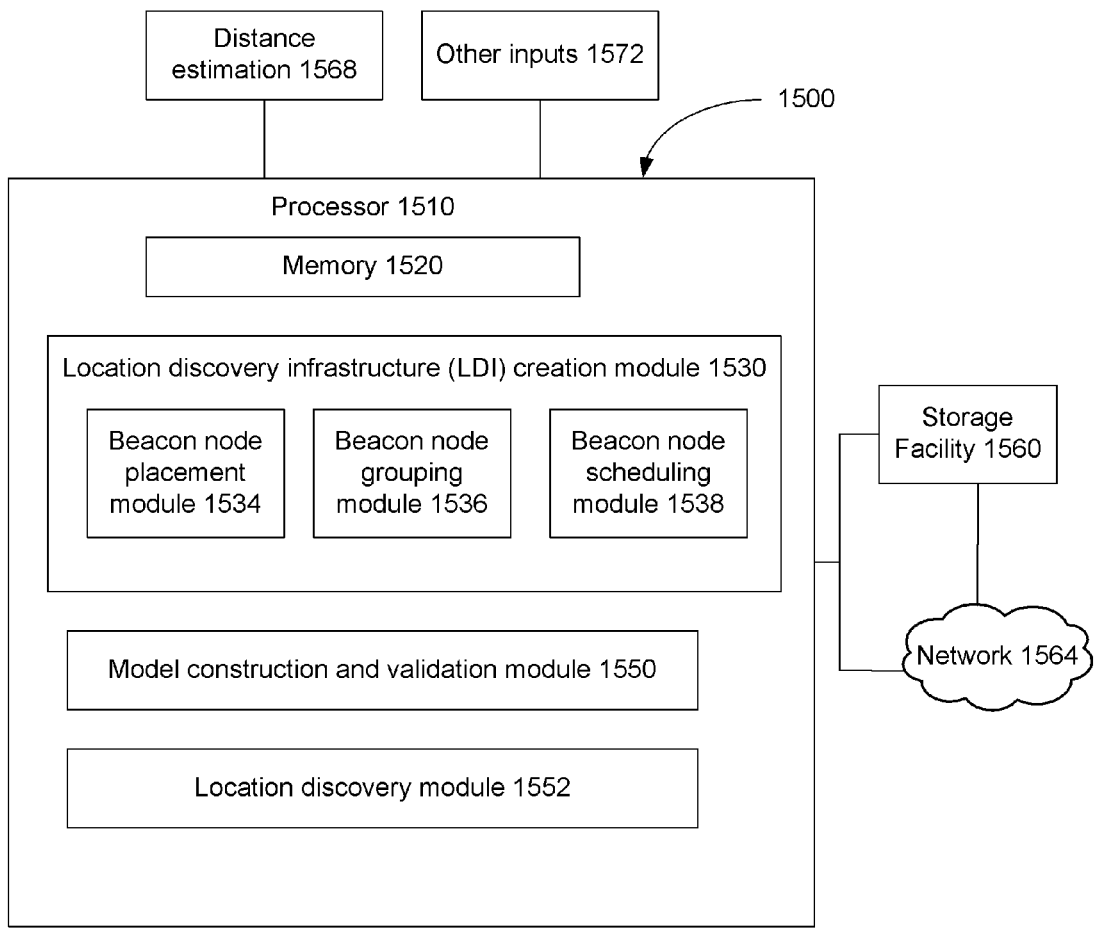
FIG. 15 illustrates an example computing system that may be suitable for practicing various embodiments.

FIG. 15 illustrates an example computing system 1500 that may be suitable for practicing various embodiments of the present disclosure. Computing system 1500 may comprise processor 1510 and memory 1520. Computing system 1500 may include one or more data models and/or computation modules configured to practice one or more aspects of this disclosure. For example, the computing system 1500 may include a LDI creation module 1530 that may be used to create a location discovery infrastructure for an example wireless network in a known terrain (e.g., terrain 200 of FIG. 2). In various embodiments, the LDI creation module 1530 may include one or more additional modules, including a beacon node placement module 1534 that may be arranged to determine a number and locations of beacon nodes to be placed in a terrain, based at least in part on likely location discovery error for discovering locations of one or more of the plurality of communication nodes using the placed beacon nodes. In various embodiments, the LDI creation module 1530 may also include a beacon node grouping module 1536 that may be arranged to determine a plurality of beacon node groups for the placed beacon nodes, based at least in part on the placed beacon nodes within individual beacon node groups being able to be active simultaneously without causing interference or collision at individual communication nodes of the plurality of communication nodes. In various embodiments, the LDI creation module 1530 may include also a beacon node scheduling module 1538 that may be arranged to determine a schedule for the placed beacon nodes to be active, based at least in part on waiting time of individual communication nodes to receive location determination signals from a plurality of beacon nodes.

In various embodiments, the computing system 1500 may also include a model construction and validation module 1550 that may be arranged to construct and/or validate one or more models (e.g., LD error model, indoor and/or outdoor terrain model, distance measurement error model, etc.) previously disclosed in this disclosure. In various embodiments, the computing system 1500 may also include a location discovery module 1552, which may be arranged to discover locations of one or more communication nodes in a network, as previously discussed in this disclosure.

In various embodiments, the computing system 1500 may be coupled to a network 1564. In various embodiments, processor 1510 may be a general-purpose processor and memory 1520 may be a hard drive, solid-state drive, Random Access Memory (RAM), or other appropriate type of memory. In various embodiments, a plurality of programming instructions may be stored within memory 1520 or other memory (e.g., external storage facility 1560) and configured to program processor 1510 to function as described within this disclosure. In various embodiments, processor 1510 may be an Application Specific Integrated Circuit (ASIC), a field programmable gate array (FPGA), or other logic device having specific functions built or programmed directly into it.

In various embodiments, one or more modules (but not all) may be present in the computing system 1500. In various embodiments, the computing system 1500 may be included in a communication node of a network. In such embodiments, the computing system 1500 may utilize the location discovery module 1552, which may be arranged to discover a location of the communication node. In various embodiments, the computing system 1500 may be included in a centralized computing device (e.g., a server) of a network or may be controlled by a user and/or an administrator of the network, and may be arranged to utilize the model construction and validation module 1550 to construct and/or validate one or more models, utilize the LDI module 1530 to develop an LD infrastructure of a network, and/or utilize the location discovery module 1552 to discover locations of one or more communication nodes.

FIG. 16 illustrates an example computing program product 1601 in accordance with various embodiments, all arranged in accordance with the present disclosure. In various embodiments, computing program product 1601 may comprise a signal bearing medium 1603 having programming instructions stored therein. The signal bearing medium 1603 may be, for example, a compact disk (CD), a digital versatile disk (DVD), a solid-state drive, a hard drive, computer disks, flash memory, or other appropriate type of data/instruction storage medium. The computer programming product 1601 may be, for example, included in or employed to program or configure a communication node, a beacon node, and/or in a peer or centralized device in a wireless network. Embodiments are not limited to any type or types of computing program products.

Signal bearing medium 1603 may contain one or more instructions 1605 configured to practice one or more aspects of the disclosure. Embodiments may have some or all of the instructions depicted in FIG. 16. Embodiments of computing program product 1601 may have other instructions in accordance with embodiments described within this specification. In various embodiments, the one or more instructions 1605 may include one or more instructions for creating a LDI for estimating locations of one or more of a plurality of communication nodes in a terrain. In various embodiments, the one or more instructions 1605 may include one or more instructions for determining a plurality of locations in the terrain to place a corresponding plurality of beacon nodes, based at least in part on likely location discovery error for discovering locations of one or more of the plurality of communication nodes using the placed beacon nodes. In various embodiments, the one or more instructions 1605 may include one or more instructions for determining a plurality of beacon node groups for the placed beacon nodes, based at least in part on the placed beacon nodes within individual beacon node groups being able to be active simultaneously without causing interference or collision at individual communication nodes of the plurality of communication nodes. In various embodiments, the one or more instructions 1605 may include one or more instructions for determining a schedule for the placed beacon nodes to be active, based at least in part on waiting time of individual communication nodes to receive location determination signals from a plurality of beacon nodes.

In various embodiments, the signal bearing medium 1603 may include a computer readable medium 1607, including but not limited to a CD, a DVD, a solid-state drive, a hard drive, computer disks, flash memory, or other appropriate type of computer readable medium. In various embodiments, the signal bearing medium 1603 may also include a recordable medium 1609, including but not limited to a floppy disk, a hard drive, a CD, a DVD, a digital tape, a computer memory, a flash memory, or other appropriate type of computer recordable medium. In various embodiments, the signal bearing medium 1603 may include a communications medium 1611, including but not limited to a fiber optic cable, a waveguide, a wired or wireless communications link, etc.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that individual function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more system units housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for a computing device to create a location discovery infrastructure (LDI) for estimating locations of one or more of a plurality of communication nodes in a terrain, comprising:
    grouping, by the computing device, the one or more of the plurality of communication nodes into a plurality of communication node groups, such that communication nodes in individual communication node groups are in proximity and have approximately no obstacles in between;
    selecting, by the computing device, a representative communication node from the individual communication node groups, the selected representative communication nodes of the plurality of communication node groups forming a dominating set of communication nodes; and
    determining, by the computing device, a number and locations of beacon nodes to be placed in the terrain, based at least in part on individual representative communication nodes receiving signals from at least three beacon nodes;
    wherein S={$S_i$},i=1, ..., $N_s$ denote the plurality of communication nodes to be divided into a plurality of communication node groups; and
    wherein the selecting comprises formulating and solving an objective function (OF) as follows:

$$OF: \min \sum_{i=1}^{N_S} d_i$$

$$\text{such that: } \sum_{j=1}^{N_S} d_j E_{ij} \geq 1, \quad i=1, \ldots, N_S,$$

$$E_{ij} = \begin{cases} 1, & \text{if communication nodes } Si \text{ and } Sj \text{ receive signals from same set of three or more beacon nodes} \\ 0, & \text{otherwise} \end{cases}, \text{ and}$$

$$d_i = \begin{cases} 1, & \text{if communication nodes } Si \text{ is selected in the dominating set} \\ 0, & \text{otherwise.} \end{cases}$$

2. The method of claim 1,
    wherein the determining is further based at least in part on reducing a likelihood of location discovery error for discovering locations of one or more of the plurality of communication nodes using the placed beacon nodes; and
    wherein the method further comprises determining, by the computing device, a schedule for the placed beacon nodes to be active, based at least in part on a waiting time of individual communication nodes to receive location determination signals from one or more beacon nodes.

3. The method of claim 1,
    wherein the determining is further based at least in part on individual representative communication nodes receiving signals from at least four of the placed beacon nodes.

4. The method of claim 1, further comprising:
    identifying, for individual pairs of the placed beacon nodes, a likelihood of interference or collision at one or more communication nodes when two beacon nodes of a pair of beacon nodes simultaneously transmits location estimation signals.

5. The method of claim 4, wherein the identifying further comprises:
    formulating a graph coloring problem, wherein individual vertices of a graph represent a corresponding beacon node, wherein an edge between two vertices of the graph represent a condition associated with the two associated beacon nodes transmitting signals simultaneously, and wherein the condition is based at least in part of identifying the likelihood of interference or collision for the two beacon nodes; and solving the graph coloring problem to determine the plurality of beacon node groups.

6. The method of claim 1, wherein the determining the schedule comprises:

determining the schedule for the placed beacon nodes to be active, based at least in part on reducing the waiting time of individual communication nodes to receive location determination signals from one or more beacon nodes.

7. The method of claim 1, wherein the determining the number and locations comprises:

determining a minimum number of beacon nodes required to be placed in the terrain.

8. The method of claim 1, wherein the determining the number and locations comprises:

determining the number and locations of beacon nodes to be placed in a terrain, based at least in part on reducing a likelihood of location discovery error for discovering locations of the representative communication nodes using the placed beacon nodes.

9. The method of claim 8, wherein determining the number and locations further comprises:

determining the likelihood of location discovery error from a location discovery model that models correlation between a number of neighboring nodes of a communication node and a likelihood of location discovery error of the communication node.

10. An apparatus for creating a location discovery infrastructure (LDI) for estimating locations of one or more of a plurality of communication nodes in a terrain, comprising:

a memory that stores a plurality of programming instructions; and a processor coupled to the memory and configured to execute the plurality of programming instructions to enable the apparatus, in response to execution of the plurality of programming instructions, to:

group one or more of the plurality of communication nodes into a plurality of communication node groups, such that communication nodes in individual communication node groups are in proximity and have approximately no obstacles in between;

select a representative communication node from the individual communication node groups, the selected representative communication nodes of the plurality of communication node groups forming a dominating set of communication nodes; and determine a number and locations of beacon nodes to be placed in the terrain, based at least in part on individual representative communication nodes receiving signals from at least three beacon nodes;

wherein $S=\{S_i\}, i=1, \ldots, N_s$ denote the plurality of communication nodes to be divided into a plurality of communication node groups; and wherein selecting comprises solving an objective function (OF) as follows:

$$OF: \min \sum_{i=1}^{N_s} d_i$$

such that: $\sum_{j=1}^{N_s} d_j E_{ij} \geq 1, \quad i=1, \ldots, N_S,$ $$E_{ij} = \begin{cases} 1, & \text{if communication nodes } S_i \text{ and } S_j \text{ receive signals from same set of three or more beacon nodes} \\ 0, & \text{otherwise} \end{cases} ; \text{and}$$

$$d_i = \begin{cases} 1, & \text{if communication nodes } S_i \text{ is selected in the dominating set} \\ 0, & \text{otherwise.} \end{cases}$$

11. The apparatus of claim 10, wherein in response to execution of the programming instructions, the apparatus is further enabled to:

determine the number and locations of beacon nodes to be placed in the terrain, based at least in part on reducing a likelihood of location discovery error for discovering locations of one or more of the plurality of communication nodes using the placed beacon nodes; and determine a schedule for the placed beacon nodes to be active, based at least in part on a waiting time of individual communication nodes to receive location determination signals from one or more beacon nodes.

* * * * *